(12) United States Patent
Croxford et al.

(10) Patent No.: US 11,798,221 B2
(45) Date of Patent: Oct. 24, 2023

(54) GRAPHICS PROCESSING

(71) Applicant: Arm Limited, Cambridge (GB)

(72) Inventors: Daren Croxford, Swaffham Prior (GB); Mathieu Jean Joseph Robart, Papworth Everard (GB); Sharjeel Saeed, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/512,425

(22) Filed: Oct. 27, 2021

(65) Prior Publication Data

US 2023/0126531 A1  Apr. 27, 2023

(51) Int. Cl.
| | |
|---|---|
| *G06T 15/06* | (2011.01) |
| *G06T 15/08* | (2011.01) |
| *G06T 17/10* | (2006.01) |
| *G06T 1/20* | (2006.01) |
| *G06T 1/60* | (2006.01) |
| *G06T 15/00* | (2011.01) |

(52) U.S. Cl.
CPC ............. *G06T 15/06* (2013.01); *G06T 1/20* (2013.01); *G06T 1/60* (2013.01); *G06T 15/005* (2013.01); *G06T 15/08* (2013.01); *G06T 17/10* (2013.01); *G06T 2210/21* (2013.01)

(58) Field of Classification Search
CPC .. G06T 15/06; G06T 1/20; G06T 1/60; G06T 15/005; G06T 15/08; G06T 17/10; G06T 2210/21
See application file for complete search history.

(56) References Cited

U.S. PATENT DOCUMENTS

| | | | |
|---|---|---|---|
| 2010/0239185 A1* | 9/2010 | Fowler | G06T 15/06 382/291 |
| 2013/0016109 A1 | 1/2013 | Garanzha | |
| 2016/0314611 A1 | 10/2016 | Shin | |
| 2017/0221177 A1* | 8/2017 | Worcester | G06T 15/005 |
| 2018/0365881 A1 | 12/2018 | Peterson | |
| 2020/0051315 A1* | 2/2020 | Laine | G06T 17/005 |

(Continued)

FOREIGN PATENT DOCUMENTS

EP  3457362  3/2019

OTHER PUBLICATIONS

Kopta, et al., "An Energy and Bandwidth Efficient Ray Tracing Architecture," HPG '13: Proceedings of the 5th High-Performance Graphics Conference, Jul. 2013 pp. 121-128, https://doi.org/10.1145/2492045.2492058.

(Continued)

*Primary Examiner* — Sing-Wai Wu
*Assistant Examiner* — Khoa Vu
(74) *Attorney, Agent, or Firm* — Vierra Magen Marcus LLP

(57) ABSTRACT

In a graphics processing system comprising a graphics processor, a main memory, and a memory management unit, when rendering a frame that represents a view of a scene comprising one or more objects using a ray tracing process and the ray tracing process requires a traversal of a ray tracing acceleration data structure indicative of the distribution of geometry for the scene being rendered to determine geometry for the scene that may be intersected by a ray, at least part of the traversal of the ray tracing acceleration data structure is performed by the memory management unit (MMU).

20 Claims, 10 Drawing Sheets

(56) References Cited

U.S. PATENT DOCUMENTS

| | | | |
|---|---|---|---|
| 2020/0051316 A1 | 2/2020 | Laine et al. | |
| 2020/0238169 A1* | 7/2020 | Konishi | A63F 13/79 |
| 2021/0090319 A1* | 3/2021 | Muthler | G06T 1/60 |
| 2021/0287422 A1* | 9/2021 | Saleh | G06T 15/06 |

OTHER PUBLICATIONS

Lee, et al., "An energy efficient hardware multithreading scheme for mobile ray tracing," SA '14: SIGGRAPH Asia 2014 Mobile Graphics and Interactive Applications, Nov. 2014 Article No. 1 pp. 1-3, https://doi.org/10.1145/2669062.2669079.

Liktor, et al., "Bandwidth efficient BVH layout for incremental hardware traversal," Intel Corporation, HPG '16: Proceedings of High Performance Graphics, Jun. 2016, http://dx.doi.org/10.2312/hpg.20161192.

Wikipedia, "Bounding volume hierarchy," retrieved at https://en.wikipedia.org/w/index.php?title=Bounding_volume_hierarchy&oldid=921578869.

Liktor, et al., "Bandwidth-Efficient BVH Layout for Incremental Hardware Traversal," Intel Corporation, 2016, http://dx.doi.org/10.2312/hpg.20161192.

Mahovsky, et al., "Memory-Conserving Bounding vol. Hierarchies with Coherent Raytracing," 2006 Comput. Graph. Forum. 25. 173-182, DOI: 10.1111/j.1467-8659.2006.00933.x.

Nah, et al., "RayCore: A ray-tracing hardware architecture for mobile devices," ACM Transactions on Graphics, Sep. 2014 Article No. 162, https://doi.org/10.1145/2629634.

Lee, "Hardware Architecture for Incoherent Ray Tracing," Samsung Advanced Institute of Technology, Ray Tracing is the Future and Ever Will Be, ACM SIGGRAPH 2013.

Gunther, et al., "Realtime Ray Tracing on GPU with BVH-based Packet Traversal," 2007, IEEE Symposium on Interactive Ray Tracing 2007, DOI: 10.1109/RT.2007.4342598.

Keely, "Reduced Precision for Hardware Ray Tracing in GPUs," 2014 High-Performance Graphics 2014, DOI: 10.2312/hpg.20141091.

Lee, et al., "SGRT: A Mobile GPU Architecture for Real-Time Ray Tracing," Proceedings of ACM High Performance Graphics 2013, 109-119, https://doi.org/10.1145/2492045.2492057.

Govindaraju, et al., "Toward-a-multicore-architecture-for-real-time-ray-tracing," DOI: 10.1109/MICRO.2008.4771789.

Spjut, et al., "TRaX: A Multicore Hardware Architecture for Real-Time Ray Tracing," in IEEE Transactions on Computer-Aided Design of Integrated Circuits and Systems, vol. 28, No. 12, pp. 1802-1815, Dec. 2009, doi: 10.1109/TCAD.2009.2028981.

Saeed, et al., "Graphics Processing," U.S. Appl. No. 16/829,940.

Non-Final Office Action dated Jan. 7, 2021, U.S. Appl. No. 16/829,940.

Response to Non-Final Office Action dated Apr. 7, 2021, U.S. Appl. No. 16/829,940.

Final Office Action dated May 7, 2021, U.S. Appl. No. 16/829,940.

Response to Final Office Action dated Nov. 8, 2021, U.S. Appl. No. 16/829,940.

Combined Search and Examination Report dated Nov. 29, 2021, Application No. GB2103854.2.

Mehaboobathunnisa R., et al., "Ray Grouping Based Ray Casting for Visualization of Medical Data", International Conference on Computing Technologies and Intelligent Data Engineering (ICCTIDE'16), 2016, pp. 1-4.

Notice of Allowance dated Mar. 2, 2022, U.S. Appl. No. 16/829,940.

* cited by examiner

GRAPHICS PROCESSING

BACKGROUND

The technology described herein relates to graphics processing systems, and in particular to the rendering of frames (images) for display.

FIG. 1 shows an exemplary system on-chip (SoC) graphics processing system 8 that comprises one or more host processors in the form of a central processing unit(s) (CPU) 1, one or more graphics processors (GPU) 2, a display processor 3 and one or more memory controllers 5.

As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 13 such as a game, executing on the host processor (CPU) 1 will, for example, require the display of frames on the display panel 7. To do this, the application will submit appropriate commands and data to a driver 11 for the graphics processor 2 that is executing on the CPU 1. The driver 11 will then generate appropriate commands, data structures and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

One rendering process that may be performed by a graphics processor is so-called "ray tracing". Ray tracing is a rendering process which involves tracing the paths of rays of light from a viewpoint (sometimes referred to as a "camera") through sampling positions in an image plane into a scene, and simulating the effect of the interaction between the rays and objects in the scene. The output data (colour) value for sampling a position in the image is then determined based on the object(s) in the scene intersected by the ray passing through the sampling position, and the properties of the surfaces of those objects. The ray tracing calculation is complex, and involves determining, for each sampling position, a set of objects within the scene which a ray passing through the sampling position intersects.

Ray tracing is considered to provide better, i.e. more realistic, physically accurate images than rasterisation rendering techniques, particularly in terms of the ability to capture reflection, refraction, shadows and lighting effects. However, ray tracing can be significantly more processing-intensive than rasterisation.

The Applicants believe that there remains scope for improved techniques for performing ray tracing using a graphics processor.

BRIEF DESCRIPTION OF THE DRAWINGS

Embodiments of the technology described herein will now be described by way of example only and with reference to the accompanying drawings, in which.

Like reference numerals are used for like elements in the Figures where appropriate.

DETAILED DESCRIPTION

Figure 1:
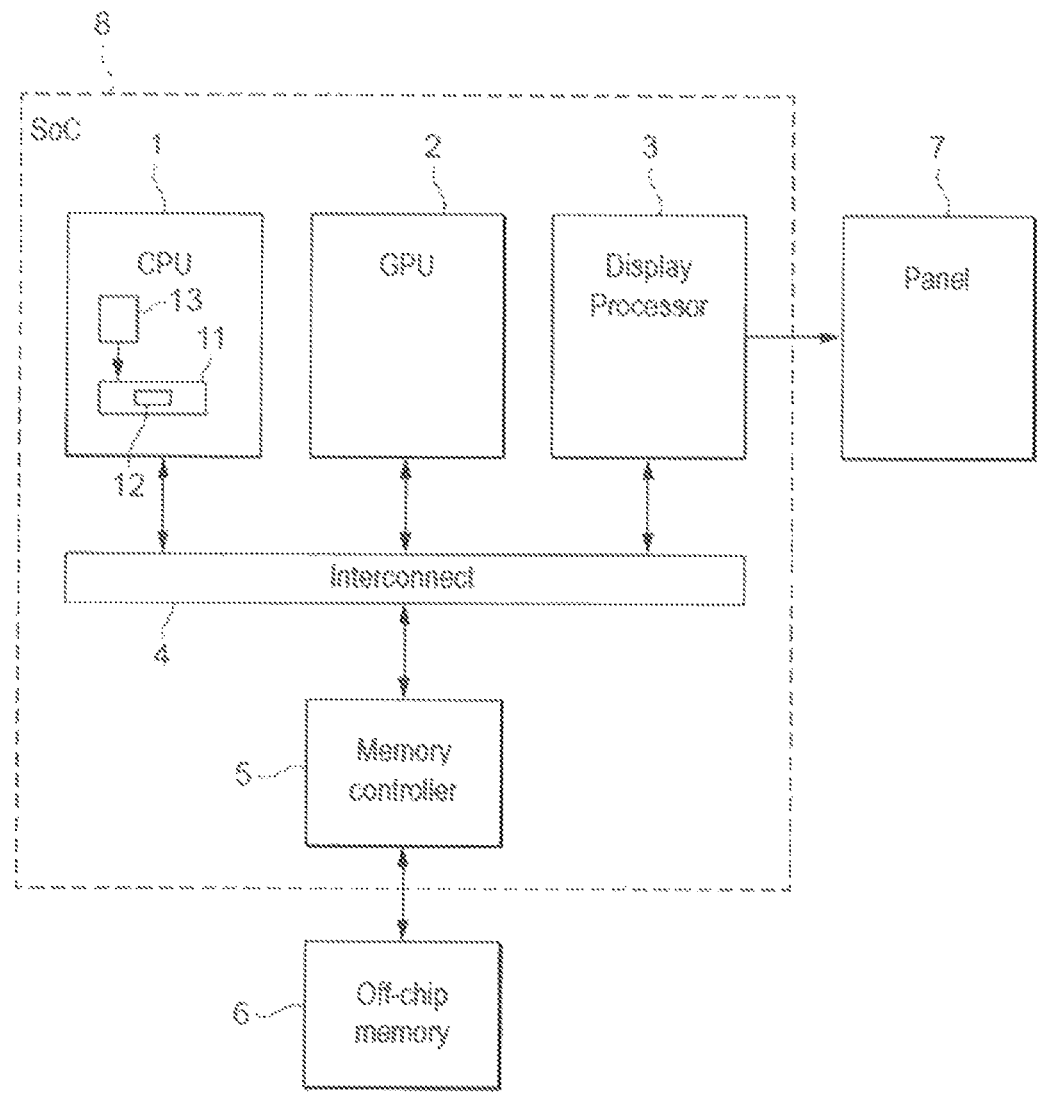
FIG. 1 shows an exemplary graphics processing system.

A first embodiment of the technology described herein comprises a method of operating a graphics processing system when rendering a frame that represents a view of a scene comprising one or more objects using a ray tracing process, the graphics processing system comprising: a graphics processor comprising a programmable execution unit; a main memory; and a memory management unit, wherein the graphics processor is able to request data from the main memory via the memory management unit;

the method comprising:
the programmable execution unit of the graphics processor executing a program to render a frame that represents a view of a scene comprising one or more objects using a ray tracing process; and
when the ray tracing process which the programmable execution unit is executing requires the determination of geometry that will be intersected by a ray, performing a traversal of a ray tracing acceleration data structure indicative of the distribution of geometry for the scene being rendered to determine geometry for the scene that may be intersected by the ray, wherein at least part of the traversal of the ray tracing acceleration data structure is performed by the memory management unit (MMU).

A second embodiment of the technology described herein comprises a graphics processing system, the graphics processing system comprising:
a graphics processor comprising a programmable execution unit, wherein the programmable execution unit is operable to execute programs to perform graphics processing operations;
a main memory; and
a memory management unit, wherein the graphics processor is able to request data from the main memory via the memory management unit;
wherein the graphics processor is configured to, when the programmable execution unit of the graphics processor is executing a program to render a frame that represents a view of a scene comprising one or more objects using a ray tracing process and the ray tracing process which the programmable execution unit is executing requires the determination of geometry that will be intersected by a ray:
trigger the performance of a traversal of a ray tracing acceleration data structure indicative of the distribution of geometry for the scene being rendered to determine geometry for the scene that may be intersected by the ray, wherein at least part of the traversal of the ray tracing acceleration data structure is performed by the memory management unit (MMU).

The technology described herein relates to the performing of ray tracing in a graphics processing system. In the technology described herein, the ray tracing operation uses an acceleration data structure, such as a bounding volume hierarchy, k-d tree, quad tree, octree, BSP-tree, etc., representative of geometry in the scene that is to be rendered to determine the intersection of rays with geometry (e.g. objects) in the scene being rendered.

In the technology described herein, the ray tracing operation is performed by a programmable execution unit of the graphics processor executing a graphics processing program to perform the ray tracing operation. However, rather than the entire ray tracing operation being performed by the programmable execution unit executing appropriate program instructions for that, at least part of the traversal of the ray tracing acceleration data structure for the ray tracing operation is performed by a memory management unit (circuit) of the graphics processing system.

In other words, rather than the programmable execution unit performing the full ray intersection determination operation, including traversing an acceleration data structure to determine geometry that could be intersected by a ray and then determining whether any geometry is actually intersected by the ray, the programmable execution unit offloads some of that processing, and in particular at least a part of the operation of traversing the ray tracing acceleration data structure to determine geometry that could be intersected by a ray, to a memory management unit (MMU) of the graphics processing system.

As will be discussed further below, this can then lead to accelerated and more efficient traversing of a ray tracing acceleration data structure, as compared, for example, to arrangements in which that is done entirely by executing appropriate programs using the programmable execution unit (which may be relatively inefficient, e.g. due to poor memory access locality for execution threads corresponding to different rays). It can also allow the ray tracing acceleration data structure traversals to be performed in parallel (simultaneously) with the programmable execution unit performing other processing.

In this regard, the Applicants have recognised that traversal of a ray tracing acceleration data structure may be performed efficiently by a memory management unit (MMU) of a graphics processing system. In 'normal' operation, the MMU will translate virtual memory addresses to physical memory addresses, and in order to perform translation of virtual memory addresses to physical memory addresses, the MMU may comprise hardware (circuits) operable to receive a virtual memory address and to traverse a hierarchy of data structures ("page tables") in order to identify a corresponding physical memory address (which process may be referred to as a "page table walk").

The Applicants have recognised that similarities exist between the processing required for a page table walk by an MMU and the traversal of a ray tracing acceleration data structure (which may likewise require various levels of a hierarchical data structure to be traversed), and that an MMU may therefore be used to also perform ray tracing acceleration data structure traversals (and may do so with relatively higher efficiency compared to performing traversal by the programmable execution unit of the GPU executing program instructions to do that), e.g., and in an embodiment, with relatively little or no modification.

The Applicants have further recognised that a ray tracing acceleration data structure traversal is likely to be large and therefore any traversal of a ray tracing acceleration data structure will be likely to need to access new pages for which the address translations have not already been determined and cached locally in the MMU. Performing the acceleration data structure traversal in the MMU as in the technology described herein in effect combines the acceleration data structure traversal and the MMU page table walk operation in the same unit, which will likely therefore increase throughput and reduce latency when an acceleration data structure traversal results in an MMU miss.

The effect of the technology described herein then is that the ray tracing acceleration data structure traversal process (and correspondingly the overall ray tracing rendering process) can be performed more efficiently, thereby facilitating, for example, performing ray tracing and/or improved ray tracing, e.g. on devices whose processing resources may be more limited, and without the need for significant modification or additions to the existing components and elements of a graphics processing system.

The graphics processing system can comprise any suitable and desired graphics processing system which is operable to generate a graphics output, e.g. an image (frame), e.g. for display on a suitable display. As well as the graphics processor, main memory and memory management unit, the graphics processing system can otherwise include any suitable and desired components, elements, processors, etc., that a graphics processing system may include, such as a host processor or processors (CPU or CPUs) that can execute applications that require graphics processing by the graphics processor, a display processor and a display for displaying images (frames) generated by the graphics processor, etc.

The graphics processor can be any suitable and desired graphics processor that includes a programmable execution unit (circuit) (for executing graphics processing programs).

The programmable execution unit can be any suitable and desired programmable execution unit (circuit) that a graphics processor may contain. It should be operable to execute graphics processing programs (shader programs) to perform graphics processing operations (shader operations). Thus the programmable execution unit will receive execution threads to be executed, and execute appropriate graphics processing (shading) programs for those threads to generate the desired graphics output.

There may be a single or plural programmable execution units. Where there are plural programmable execution units, each execution unit can in an embodiment operate in the manner of the technology described herein.

The main memory of the graphics processing system may comprise a memory which is logically and/or physically separate from the graphics processor (GPU). For example, in embodiments where the graphics processor is part of a system-on-chip (SoC), the main memory may comprise off-chip memory. The main memory may comprise random access memory (RAM), e.g. such as dynamic random access memory (DRAM). The main memory may be shared among multiple processors of the graphics processing system.

The graphics processor is operable to and configured to, when it requires data from main memory, send a request to the memory management unit (MMU) (such that requests for data from main memory are handled by the MMU).

The memory management unit (MMU) of the graphics processing system can be any suitable and desired memory management unit (circuit), and should be, and is preferably, configured to handle requests for reading data from (or writing data to) main memory by the graphics processor (and, e.g., other processors of the graphics processing system). The MMU is in an embodiment configured to provide virtual-to-physical address translations for permitting processor(s) of the graphics processing system to read from (or write to) main memory. For example, the memory management unit (MMU) can in an embodiment take as an input a virtual memory address received from a processor of the graphics processing system, and determine a corresponding physical memory address identifying a physical location in the main memory from which data is to be read (or to which data is to be written).

The MMU may generally provide address translation functions for accesses, including to main memory. For example it may provide address translation when accessing other peripherals, etc., as well as for accesses to main memory.

The MMU may perform address translation operations in any suitable and desired manner. For example it could provide translations directly for a virtual address to a physical address (a stage 1 translation) or it could perform translations from a virtual address to an intermediate physical address and then to a physical address (stage 1+stage 2 translations), as desired.

The MMU may be logically and/or physically separate from the graphics processor (e.g. such that the MMU does not share any circuits with the graphics processor) (and in one embodiment, this is the case). For example, the MMU may be shared with other processors/units of the system such as a display processor, DMA, etc. (be an SMMU (System MMU)).

In an embodiment, the MMU is at least partly integrated into the graphics processor (the GPU). In this case, the MMU that is used by the graphics processor could be entirely integrated into the GPU (and in one embodiment that is the case). In this case the MMU in the graphics processor in an embodiment performs "stage 1" translation (as discussed above). It would also be possible for the graphics processor to include an MMU that performs stage 1 translation, but with the overall MMU operation also using an external MMU (a system MMU) that performs any required stage 2 translation.

Thus in an embodiment, the graphics processor comprises an (the) MMU that performs at least part of the traversal of the ray tracing acceleration data structure. Where the graphics processor includes an MMU and there is also an external MMU, then one or both of the MMU on the graphics processor and the external MMU could be used to perform at least part of the traversal of the ray tracing acceleration data structure, if desired.

Thus, a further embodiment of the technology described herein comprises a method of operating a graphics processor when rendering a frame that represents a view of a scene comprising one or more objects using a ray tracing process, the graphics processor comprising: a programmable execution unit; and a memory management unit;
the method comprising:
the programmable execution unit of the graphics processor executing a program to render a frame that represents a view of a scene comprising one or more objects using a ray tracing process; and
when the ray tracing process which the programmable execution unit is executing requires the determination of geometry that will be intersected by a ray, performing a traversal of a ray tracing acceleration data structure indicative of the distribution of geometry for the scene being rendered to determine geometry for the scene that may be intersected by the ray, wherein at least part of the traversal of the ray tracing acceleration data structure is performed by the memory management unit (MMU) of the graphics processor.

Another embodiment of the technology described herein comprises a graphics processor, the graphics processor comprising:
a programmable execution unit, wherein the programmable execution unit is operable to execute programs to perform graphics processing operations; and
a memory management unit;
wherein the graphics processor is configured to, when the programmable execution unit of the graphics processor is executing a program to render a frame that represents a view of a scene comprising one or more objects using a ray tracing process and the ray tracing process which the programmable execution unit is executing requires the determination of geometry that will be intersected by a ray:
trigger the performance of a traversal of a ray tracing acceleration data structure indicative of the distribution of geometry for the scene being rendered to determine geometry for the scene that may be intersected by the ray, wherein at least part of the traversal of the ray tracing acceleration data structure is performed by the memory management unit (MMU) of the graphics processor.

As will be appreciated by those skilled in the art, these embodiments of the technology described herein may, and in an embodiment do, comprise any one or more or all of the features of the technology described herein described herein, as appropriate.

The MMU may comprise any desired and suitable hardware (circuits) for determining a virtual-to-physical address translation.

To assist with virtual-to-physical address translations, the MMU in an embodiment comprise a local storage, e.g. a cache (a "translation lookaside buffer" (TLB)) which can store virtual-to-physical memory address translations. For example, the MMU may be configured to store one or more recently used translations in its local storage. The MMU cache may be hierarchical, if desired (e.g. comprising a TLB and a µTLB).

In embodiments, the MMU is configured to, when the MMU receives a request from a processor to read from (or write to) main memory, if a relevant virtual-to-physical address translation is present in its local storage (the translation lookaside buffer (TLB)), identify the relevant physical address (and access permissions) on the basis of the translation stored in the local storage. However, if a relevant translation is not present in the local storage of the MMU (such that a "miss" occurs), the MMU in an embodiment operates to determine an appropriate virtual-to-physical address translation using translation data from the main memory (and in an embodiment then stores the determined translation in its local storage).

Determining a virtual-to-physical address translation may comprise the MMU accessing translation data stored in main memory.

The translation data in main memory may comprise one or more tables (known as "page tables"), and in an embodiment a hierarchy of tables (hierarchy of page tables). Each entry in a table may relate to a region (block) (also known as a "page") of virtual memory addresses, and indicate a corresponding region (block) of physical memory addresses or provide information for (e.g. a pointer to) another table having entries relating to smaller regions (blocks) of virtual memory addresses. Thus, tables at (successively) higher levels of the hierarchy of tables may have entries relating to (successively) smaller regions (blocks) of virtual address space.

The MMU may be configured to traverse the hierarchy of tables (a process known as "page table walk") in order to determine a corresponding physical memory address for a virtual memory address. This process may comprise for a virtual memory address, performing a series of one or more table lookups progressing through the hierarchy of tables, until a physical memory address (or a region of physical memory addresses) is returned by a (final) table lookup in the series of table lookups. Of course, the particular path through the hierarchy of tables (the particular series of table lookups), and accordingly the determined corresponding physical memory address, may differ depending on the particular virtual memory address which the MMU receives as an input.

The MMU may store the (final) determined virtual-to-physical address translation in its local storage (e.g. in the translation lookaside buffer (TLB)).

The MMU may also have local storage (e.g. a cache, referred to herein as a "walk cache") for storing information regarding one or more traversals of the hierarchy of tables which have (previously) been performed. For example information may be stored relating to the particular path taken through the hierarchy of tables (the particular page table walk taken). In embodiments, the MMU may be configured to store information for partial or entire traversals (page table walks) in its local storage. In embodiments, the local storage for information regarding traversals (the "walk cache") could be logically and/or physically separate from the local storage for the virtual-to-physical address translations (the "translation lookaside buffer" (TLB)). However, any other suitable and desired local storage configuration could be used.

The technology described herein relates to the situation where a frame that represents a view of a scene comprising one or more objects is being rendered using a ray tracing process. In this process, the frame that is being rendered will, and in an embodiment does, comprise an array of sampling positions, and a ray tracing process will be used to render each of the sampling positions so as to provide an output frame (an image) that represents the desired view of the scene (with respective rays that are cast corresponding to and being used when rendering and to render respective sampling positions for the frame).

The technology described herein can be used for any form of ray tracing based rendering.

Thus, for example, the technology described herein can be used for and when a "full" ray tracing process is being used to render a scene, i.e. in which so-called "primary" rays are cast from a view point (the camera) through a sampling position in the image frame to determine the intersection of that ray with objects in the scene, e.g., and in an embodiment, to determine, for each ray, a closest object in a scene that the ray intersects (a "closest intersection point" of the ray). The process may involve casting further (secondary) rays from the respective intersection points of primary rays with objects in the scene, and additionally using the intersection data for the secondary rays in determining the rendering of the sampling positions.

In this case, the operation in the manner of the technology described herein may be, and is in an embodiment, used when and for analysing the intersections of both primary and secondary rays with objects in the scene.

The technology described herein can also be used for so-called "hybrid" ray tracing rendering processes, e.g. in which both ray tracing and rasterisation processes are performed when performing rendering (e.g. in which only some of the steps of a full ray tracing process are performed, with a rasterisation process or processes being used to implement other steps of the "full" ray tracing process). For example, in an exemplary hybrid ray tracing process, the closest intersection of each of the primary rays with objects in the scene may be determined using a rasterisation process, but with the casting of one or more further (secondary) rays from the determined respective closest intersection points of primary rays with objects in the scene then being performed using a ray tracing process. In this case, the operation in the manner of the technology described herein may be, and is in an embodiment, used when and for analysing the intersections of the secondary rays with objects in the scene.

As part of the ray tracing process (and in particular, the casting of a ray through a sampling position in the image frame into the scene to determine the intersection of the ray with objects in the scene), a so-called "ray tracing acceleration data structure" that indicates and represents the distribution of geometry in the scene being rendered is traversed for a ray, to determine geometry for the scene that may be intersected by the ray that is being "cast" into the scene.

In the technology described herein, when (the programmable execution unit of) the graphics processor is executing a shader program to perform a ray tracing based rendering process, and the tracing (casting) of a ray into the scene being rendered is required as part of the ray tracing rendering process, at least part of the traversal of the ray tracing acceleration data structure for the ray in question is performed by the MMU.

As discussed above, depending upon the ray tracing rendering process being used (and the stage of the ray tracing rendering process that has been reached for a given sampling position), the ray that is being cast could comprise a primary ray (e.g. from a viewpoint through a sampling position in an image plane into the scene), or a further (secondary) ray, e.g. that has been cast from a determined intersection with geometry by a primary ray, e.g., and in an embodiment, to determine lighting/shadowing and/or reflections, etc. The operation in the manner of the technology described herein is applicable whatever form of ray is being cast.

The ray tracing acceleration data structures that are used and traversed in the technology described herein can be any suitable and desired ray tracing acceleration data structures that are indicative of (that represent) the distribution of geometry for a scene to be rendered and that can be used (and traversed) to determine geometry for a scene to be rendered that may be intersected by a ray traversing the scene.

The ray tracing acceleration data structure in an embodiment represents (a plurality of) respective volumes within the scene being rendered and indicates and/or can be used to determine geometry for the scene to be rendered that is present in those volumes.

The ray tracing acceleration data structure(s) can take any suitable and desired form, such as comprising a tree structure, such as a bounding volume hierarchy (BVH) tree. The bounding volumes may be axis aligned (cuboid) volumes.

In one embodiment, the ray tracing acceleration data structure comprises a bounding volume hierarchy, and in an embodiment a BVH tree. However, other forms of acceleration data structure, such as a KD tree, voxels (grid hierarchies), etc., could be used, if desired.

The ray tracing acceleration data structure that is traversed can be generated and provided in any suitable and desired manner. For example, it may be previously determined and provided, e.g., as part of the definition of the scene to be rendered by the application that requires the graphics processing.

In an embodiment, the ray tracing acceleration data structure is generated by the graphics processor itself, e.g. based on an indication of geometry for the scene that is provided to the graphics processor, e.g. in a preliminary processing pass before the scene is rendered. In this case, the graphics processor can generate the ray tracing acceleration data structure in any suitable and desired manner, for example by testing geometry defined for the scene against respective bounding volumes, so as to determine the distribution of the geometry in a bounding volume hierarchy for the scene.

It could also or instead be generated by a CPU (e.g. host processor), e.g. based on an indication of geometry for the scene, e.g. in a preliminary processing pass before the scene is rendered.

Other arrangements would, of course, be possible.

The ray tracing acceleration data structure can represent and be indicative of the distribution of geometry for a scene to be rendered in any suitable and desired manner. Thus it may represent the geometry in terms of individual graphics primitives, or sets of graphics primitives, e.g. such that each leaf node of the tree structure represents a corresponding subset of the graphics primitives defined for the scene that occupies the volume that the leaf node corresponds to. Additionally or alternatively, the ray tracing acceleration data structure could represent the geometry for the scene in the form of higher level representations (descriptions) of the geometry, for example in terms of models or objects comprising plural primitives.

It would also be possible for a given ray tracing acceleration data structure to represent the geometry in terms of indicating further ray tracing acceleration data structures that need to be analysed. In this case, an initial ray tracing acceleration data structure would, for example, represent further, e.g. finer resolution, ray tracing acceleration data structures that need to be considered for different volumes of the scene, with the traversal of the initial ray tracing acceleration data structure then determining a further ray tracing acceleration data structure or structures that need to be traversed depending upon which volumes for the scene the ray in question intersects.

Thus the ray tracing traversal operation could include transitions between different ray tracing acceleration data structures, such as transitions between different levels of detail (LOD), and/or between different levels of multi-level ray tracing acceleration data structures.

There may also be ray transformations between ray tracing acceleration data structure switches (e.g. such that there is an automatic transition between different ray tracing acceleration data structures with and/or using a transformation of the ray, e.g. described by metadata of or associated with the ray tracing acceleration data structure). For example, a transition between different levels of detail could use an identity transform, and transitions between multi-level ray tracing acceleration data structures could use generic affine transformations of the rays.

Other arrangements would, of course, be possible.

The ray tracing acceleration data structures that are used in the technology described herein are in an embodiment stored in the main memory, such that they can then be accessed therefrom by the memory management unit (and any other element of the graphics processing system, such as the graphics processor that may require them).

When the memory management unit (MMU) is required to perform at least a part of a traversal of a ray tracing acceleration data structure for a ray in the operation of the technology described herein, that operation of the MMU can be triggered in any suitable and desired manner. In an embodiment, this is done by sending a message to trigger that operation to the memory management unit (MMU).

The message that is sent to the MMU could be sent directly by the programmable execution unit when it determines that a traversal of a ray tracing acceleration data structure for a scene to determine geometry for the scene that may be intersected by a ray is required when executing a graphics processing program to render a frame using a ray tracing process (and in one embodiment that is the case).

In an embodiment, and as will be discussed further below, the message to trigger the traversal of a ray tracing acceleration data structure for a ray by the MMU is sent via and by a local storage of the graphics processor which local storage is operable to store the results of previous ray tracing acceleration data structure traversals provided by the MMU, with the performance of a ray tracing acceleration data structure traversal by the MMU then being triggered (and the appropriate message sent) by the local storage, e.g., and in one embodiment, in the event that the local storage of the graphics processor does not already store the relevant ray tracing acceleration data structure traversal result.

In one embodiment therefore, when the programmable execution unit determines that the determination of geometry that will be intersected by a ray is required when executing a program to render a frame using a ray tracing process, it will first be determined whether the required ray tracing acceleration data structure traversal result (that the MMU will provide) is already present in the local storage, and when the required ray tracing acceleration data structure traversal result is not (is other than) stored in the local storage, the MMU will be triggered to perform at least part of the required ray tracing acceleration data structure traversal (by sending a message to that effect to the MMU) (but when the required ray tracing acceleration data structure traversal result is already stored in the local storage, the result will be used (retrieved) from the local storage, without triggering the MMU to perform the (any) ray tracing acceleration data structure traversal).

In an embodiment, the local storage triggers the MMU to perform at least part of the required ray tracing acceleration data structure traversal (sends a message to that effect to the MMU) when there is a "miss" in the local storage.

The operation of triggering a ray tracing acceleration data structure traversal by the MMU by the local storage of the graphics processor may, and in an embodiment does, depend upon what is stored in the local storage as the result of a previous ray tracing acceleration data structure traversal. For example, and as will be discussed in more detail below, in the case where the local storage simply stores a leaf node as the result of a ray tracing acceleration data structure traversal (to then, e.g., allow an actual geometry intersection test to be performed), then the local storage in an embodiment always triggers the performance of ray tracing acceleration data structure traversal by the MMU when it receives a request to that effect from the programmable execution unit.

On the other hand, where the local storage of the graphics processor stores ray tracing acceleration data structure "traversals" (i.e. starting from a root node of the traversal), then the locally stored traversal could first be checked to determine if some or all of it can be used for the new ray, with the MMU then only being triggered to perform some or all of the ray tracing acceleration data structure traversal (by the local storage) in the event that any cached traversal in the local storage does not suffice to provide the result of a complete traversal for the ray in question.

Other arrangements would, of course, be possible.

This operation will be discussed in more detail below.

The message (information) that is sent to the MMU to trigger it to perform (at least part of) a ray tracing acceleration data structure traversal for a ray should, and in an embodiment does, contain information that is required to perform the relevant ray tracing acceleration data structure traversal operation. Thus it in an embodiment indicates one or more of, and in an embodiment all of: the ray tracing acceleration data structure that is to be traversed; the origin (originating position (e.g. x, y, z coordinates)) for the ray that is to be tested (for which the traversal of the ray tracing acceleration data structure is to be determined); the direction of (a direction vector for) the ray that is to traverse the ray tracing acceleration data structure; and the range (distance) that the ray is to traverse (the (minimum and/or maximum) distance the ray is to traverse into the scene).

It would also be possible for some or all of these parameters, such as the minimum distance that the ray is to traverse, to be set (fixed) for the entire scene and thereby configured only once for a scene, rather than being indicated for each individual ray, if desired. Similarly, the, e.g. level of detail (LOD) of the model to use could be configured depending upon the distance of the ray from the camera.

At least in the case where the graphics processor includes plural programmable execution units, the message in an embodiment also indicates which programmable execution unit the traversal relates to (is for), so that the result of the ray tracing acceleration data structure traversal operation can be returned to the correct programmable execution unit.

In response to the message, the MMU will perform a traversal of the appropriate, e.g. indicated, ray tracing acceleration data structure(s) to determine geometry for the scene to be rendered that may be intersected by the ray in question.

The MMU can traverse the ray tracing acceleration data structure(s) for a ray in any suitable and desired manner, e.g., and in an embodiment in dependence upon the form of the ray tracing acceleration data structure that is being traversed. The traversal operation will use the information provided about the ray to traverse the ray tracing acceleration data structure to determine geometry for the scene to be rendered that may be intersected by the ray in question. In an embodiment, the MMU traverses and uses the ray tracing acceleration data structure to identify geometry (if any) in volumes of the scene (and that is indicated by the ray tracing acceleration data structure) that the ray passes through.

Thus, the traversal process in an embodiment operates to traverse the ray tracing acceleration data structure to determine for each volume of the scene that the ray passes through in turn, whether there is any geometry in the volume (indicated by the ray tracing acceleration data structure). Thus, the ray tracing acceleration data structure will be traversed based on the position and direction of the ray, to determine whether there is any geometry in the volumes of the scene along the path of the ray (which could, accordingly, then potentially be intersected by the ray). Other arrangements would, of course, be possible.

In an embodiment, the traversal operation traverses the ray tracing acceleration data structure for the path of the ray until a closest (potential) intersection with geometry defined for the scene is found for the ray (until a closest (e.g. at the smallest volume level) volume along the path of the ray that contains geometry that could (potentially) be intersected by the ray is found). However, it would also be possible to continue traversal of the ray tracing acceleration data structure after a closest (potential) intersection has been found for a ray, if desired.

For example, the ray traversal operation could be (and in an embodiment is) configured and able to discard (ignore) a (potential) intersection and to carry on with the traversal, e.g. depending upon the properties of the geometry for the intersection in question. For example, if a (potentially) intersected geometry is fully or partially transparent, it may be desirable to continue with the traversal (and either discard or retain the initial "transparent" intersection).

Other arrangements would, of course, be possible.

The ray tracing acceleration data structure traversal for a ray could comprise traversing a single ray tracing acceleration data structure for the ray, or traversing plural ray tracing acceleration data structures for the ray. Thus, in an embodiment the ray tracing acceleration data structure traversal operation for a ray comprises traversing plural ray tracing acceleration data structures for the ray, to thereby determine geometry for the scene to be rendered that may be intersected by the ray.

Plural ray tracing acceleration data structures may be traversed for a ray e.g. in the case where the overall volume of, and/or geometry for, the scene is represented by plural different ray tracing acceleration data structures.

Similarly, as discussed above, in one embodiment, a ray tracing acceleration data structure that indicates further ray tracing acceleration data structures to be traversed is used. In this case therefore MMU will operate to first traverse an initial ray tracing acceleration data structure for the ray to determine one or more further ray tracing acceleration data structures to be traversed for the ray, and to then traverse those determined one or more ray tracing acceleration data structures for the ray, and so on, until an "end" ray tracing acceleration data structure or structures that provides an indication of geometry for the scene to be rendered is traversed for the ray.

In an embodiment, in the case where plural acceleration data structures are to be traversed, that is in an embodiment triggered and performed by the MMU itself (i.e. without any return to the programmable execution unit between ray tracing acceleration data structure transitions). However, it would also be possible for this operation to be achieved in different ways, e.g. with the MMU traversing a first ray tracing acceleration data structure and then returning the result of that to the programmable execution unit, with the programmable execution unit then triggering the traversal of any further ray tracing acceleration data structure that is required, and so on.

In an embodiment, the MMU is configured to, and operable to, group rays (traversal requests) that are to traverse the same acceleration data structure together, so as to execute the traversals of the acceleration data structure for the rays of the group of rays together.

In an embodiment, rays that are sufficiently similar to each other and that are to traverse the same acceleration data structure are grouped together, so as to execute the traversals of the acceleration data structure for the rays of the group together. This will help to increase memory locality, and, accordingly, improve the effectiveness of any caching of the ray tracing acceleration data structure (and correspondingly reduce the number of off-chip memory accesses that may be required).

In this case, the rays are in an embodiment grouped together based on their similarities to each other, such that "similar" rays will be grouped together for this purpose. Thus rays are in an embodiment grouped for traversing the (same) ray tracing acceleration data structure together based on one or more particular, in an embodiment selected, in an embodiment predefined criteria, such as one or more of, and in an embodiment all of: the starting positions (origins) for the rays; the directions (direction vectors) of the rays; and the range that the rays are to be cast for.

In order to facilitate this operation, the MMU can in an embodiment maintain a "pool" of rays that are waiting to traverse an acceleration data structure (e.g. in an appropriate queue or buffer (cache) on or accessible to the MMU), and select groups of one or more rays from that pool for processing, e.g., and in an embodiment, based on one or more or all of the criteria discussed above. This will then facilitate the MMU identifying and processing groups of similar rays together.

In this case, rays that are in the "pool" and that are waiting to traverse a ray tracing acceleration data structure in an embodiment have their duration in the pool (their "ages") tracked, with any ray whose duration in the pool exceeds a particular, in an embodiment selected, in an embodiment predetermined, threshold duration ("age"), then being prioritised for processing, e.g., and in an embodiment, without waiting any further for later, "similar" rays to arrive for processing. This will then help to ensure that rays are not retained in the pool for too long whilst waiting for other rays potentially to group with the ray.

Other arrangements would, of course, be possible.

Once a group of rays to be processed together have been selected, then the rays should be processed together as a group.

In the case where the MMU supports processing only one ray at a time, then the group of rays is in an embodiment processed together by the MMU by the MMU processing each ray of the group in turn, immediately one after another.

On the other hand, where the MMU can perform traversals for plural rays in parallel (simultaneously), then the traversals for some or all of the rays of the group can be, and are in an embodiment, performed in parallel, or mostly simultaneously, e.g. back-to-back.

The groups of rays for which the traversals of the ray tracing acceleration data structure are performed together can comprise any suitable and desired (plural) number of rays, although there may, e.g., and in an embodiment, be a particular, in an embodiment selected, in an embodiment defined, maximum number of rays for which the traversals may be performed together, e.g. depending upon the parallel processing capability of the MMU in this regard.

Other arrangements would, of course, be possible.

The memory management unit (MMU) operates in the technology described herein to perform at least part of the ray tracing acceleration data structure traversal. The MMU can perform any suitable and desired part of the ray tracing acceleration data structure traversal operation. In an embodiment, it performs at least the first part (the initial part) of the traversal (i.e. starting at the largest volume of the scene represented by the ray tracing acceleration data structure (at the root node of the ray tracing acceleration data structure).

In an embodiment, the MMU performs the entire traversal of the ray tracing acceleration data structure, i.e. traverses the ray tracing acceleration data structure or structures down to the smallest volume represented by the ray tracing acceleration data structure or structures in question. In this case therefore, where the ray tracing acceleration data structure is in the form of a "tree", the MMU will traverse the ray tracing acceleration data structure or structures down to the leaf nodes, and identify a leaf node volume that is intersected by the ray in question. Thus, in an embodiment, the MMU traverses the ray tracing acceleration data structure or structures so as to identify a smallest volume represented by the ray tracing acceleration data structure or structures in question that is intersected by the ray in question.

Other arrangements would, of course, be possible. For example, the MMU could traverse the ray tracing acceleration data structure or structures so as to identify a branch of the ray tracing acceleration data structure(s) to be followed for the ray and/or an intermediate (but not the smallest) volume represented by those structure(s) that is intersected by the ray (that the branch encompasses).

In this case, the remainder of the traversal of the ray tracing acceleration data structure (from the intermediate volume returned by the MMU down to the smallest volume (e.g. leaf node)) may be, and is in an embodiment, performed by another element or component of the graphics processing system, such as by or on the graphics processor itself (e.g. using an acceleration data structure traversal circuit of the graphics processor for that process). This will be discussed in more detail below.

Once the ray tracing acceleration data structure traversal operation for a ray has been performed, the MMU should, and in an embodiment does, return to the graphics processor, e.g., and in an embodiment to the programmable execution unit of the graphics processor, the result of the ray tracing acceleration data structure traversal for the ray.

Thus, in an embodiment, the method of the technology described herein comprises the MMU (and the MMU is configured to) returning the result of a ray tracing acceleration data structure traversal for a ray that it has performed to the graphics processor (and in an embodiment to the programmable execution unit of the graphics processor).

Again, the result of the ray tracing acceleration data structure traversal for a ray could be returned directly to the programmable execution unit, or could be returned to and via local storage of the graphics processor that stores the result of ray tracing acceleration data structure traversals performed by the MMU (as discussed above) (and in an embodiment, this is the case).

The result that is returned by the MMU will depend upon how much of the ray tracing acceleration data structure traversal process is performed by the MMU. Thus where, for example, the MMU does only part of, but not all of, the traversal, it may, and in an embodiment does, return appropriate information relating to that partial traversal, such as, and in an embodiment, an indication of (e.g. pointer(s) to) the next level of the ray tracing acceleration data structure to be traversed, and/or an appropriate identification of the (intermediate) volume that the partial traversal has determined the ray to intersect (e.g. that the identified branch to be followed encompasses), which information can then, e.g., be used to perform and/or trigger the performance of further traversal of the relevant ray tracing acceleration data structure.

In the case that the MMU performs the entire traversal, i.e. traverses the ray tracing acceleration data structure(s) to determine a smallest volume (an end volume) (a leaf node) represented by the ray tracing acceleration data structure that is intersected by a ray (and the ray was found to intersect such a volume of the scene that contains geometry defined for the scene (thus the traversal operation found that there is geometry defined for the scene that the ray potentially intersects), then the MMU in an embodiment returns as the result of its ray tracing acceleration data structure traversal, an appropriate indication of the geometry defined for the scene that is present within (for) the volume in question (that was determined to be intersected by the ray) (an indication of geometry for the scene to be rendered that may be intersected by the ray).

In this case, the indication of geometry for the scene to be rendered that may be intersected by the ray in question can indicate the geometry that could be intersected for the ray in any suitable and desired manner, e.g., and in an embodiment, in dependence upon the format of the ray tracing acceleration data structure that has been traversed. Thus, this could be in the form of a set of one or more primitives (e.g. points, lines or polygons, such as triangles, etc., and/or spheres, cylinders, cones, etc.) that could be intersected by the ray, and/or some form of higher level definition and/or description of geometry that could be intersected by the ray, for example in the form of more general or generic references to geometry, such as higher order representations of geometry for the scene. It may also include a set of vertices for the primitives (or at least identify the vertices for the primitives).

The information that is provided for the (potentially) intersected geometry can take any suitable and desired form, e.g., and in an embodiment, in dependence upon the form of the geometry itself. For example, in the case of a set of primitives (as candidates for intersection), the appropriate primitive identifiers and any associated geometry identifier (e.g. to which they belong) could be returned.

In an embodiment position and direction vectors for the ray are also returned by the MMU.

In an embodiment, the result returned by the MMU also provides an indication of the material type for the geometry that may be intersected, e.g., and in an embodiment, in the form of a pointer/index to a shader program (for the material type in question).

In an embodiment, the result returned by the MMU provides (at least) sufficient information to allow an intersection test to determine the geometry (if any) that will be intersected by the ray in question to be performed. Thus, for example, the returned result of the traversal from the MMU in an embodiment comprises a "leaf node" to allow a geometry intersection determination to be performed.

The returned result of the traversal of a ray tracing acceleration data structure or structures for a ray can include any suitable and desired information that may be necessary and used to perform an intersection test to determine the geometry (if any) that will be intersected by the ray. In an embodiment, it comprises an indication of geometry that may be intersected by the ray, such as, and in an embodiment, an indication of any geometry defined for the scene that is present in the volume (e.g. the leaf node) that was found to be intersected by the ray. In an embodiment, the indication of geometry that may be intersected by the ray includes information relating to the properties of the geometry in question.

The Applicants have recognised that it would also be possible for the traversal for a ray to fail to find any geometry defined for the scene that the ray could potentially intersect, e.g. in the case when none of the volume of the scene that the ray passes through contains any defined geometry for the scene.

In the case that the MMU finds that the ray does not traverse any volume that contains defined geometry for the scene, then the MMU in an embodiment returns an appropriate response in that event. In an embodiment, the MMU returns a response indicating that nothing has been intersected by the ray (that no potential intersection has been found) (i.e. that there has been a "miss").

Thus, in an embodiment, the MMU, when performing a ray tracing acceleration data structure traversal, operates to (and is configured to) determine whether any of the volumes in the scene represented by the ray tracing acceleration data structure traversed by the ray contain any geometry for the scene, and in the case where the ray does traverse a volume for the scene that contains geometry defined for the scene, returns an indication of the geometry for the volume in question, but where the ray does not traverse any volume that contains geometry defined for the scene, returns an indication of that (a "miss" event).

In an embodiment, the MMU, when performing a ray tracing acceleration data structure traversal, as well as returning the end volume (e.g. leaf node) result of the traversal so as to allow an intersection test to determine the geometry (if any) that will be intersected by the ray to be performed, also returns to the graphics processor (and in an embodiment to the local storage of the graphics processor) information relating to the ray tracing acceleration data structure traversal that has been performed for the ray (that is other than the final result of the traversal).

In an embodiment, this information comprises information relating to the particular path (the traversal (walk)) taken through the ray tracing acceleration data structure (the particular ray tracing acceleration data structure traversal (walk) taken). In this case, the information that is returned and, e.g., and in an embodiment, stored (cached) in the local storage of the graphics processor, in an embodiment comprises information relating to the branch or branches of the acceleration data structure that were taken, such as and in an embodiment, pointers to the next level of the data structure, and/or an indication of the volume that was reached (that the branch encompasses).

This traversal information is in an embodiment such that the traversal can be performed (and repeated) from the returned traversal information (walk), to allow (another) ray to be tested along that traversal (using the information returned to, and stored in, the local storage, ray tracing acceleration data structure result cache), either until the end of the traversal (e.g. leaf node) (which will also be returned) is reached, or there is a divergence during the traversal (e.g. and in an embodiment, such that a new traversal in the MMU can then be triggered).

This will then allow the graphics processor to potentially avoid the need to trigger a ray tracing acceleration data structure traversal on the MMU in the case where the local storage of the graphics processor already stores (caches) a traversal that can be reused for a ray.

The indication of the geometry that may be intersected by a ray that has been determined by the MMU, the traversal for a ray, and/or a "miss" event, as appropriate, can be returned by the MMU in any suitable and desired manner. This is in an embodiment done by means of the MMU sending an appropriate message, e.g. containing the required geometry (or "miss") information, to the graphics processor (e.g. to the local storage or programmable execution unit, as appropriate). Other arrangements would, of course, be possible.

The memory management unit (MMU) can be configured to perform the desired part or all of the ray tracing acceleration data structure traversal in any suitable and desired manner, for example, and in an embodiment, in dependence upon the form of ray tracing acceleration data structure or structures that could be or will be used.

It should be noted here that the MMU is configured to perform a traversal of a ray tracing acceleration data structure, e.g., and in an embodiment, to determine geometry that may be intersected by a ray, but in an embodiment does not and is not intended to perform any actual intersection of the geometry with the ray itself (so the MMU does not determine the intersection itself, but rather traverses the ray tracing acceleration data structure, e.g. to determine geometry that a ray should be intersection-tested against, without performing the intersection test itself).

As will be appreciated, the ray tracing acceleration data structure traversal will comprise, for example, and in an embodiment, accessing the ray tracing acceleration data structure stored in main memory and the traversal may, and in an embodiment does, comprise performing a series of one or more ray tracing acceleration data structure lookups in the main memory as the traversal progresses through the ray tracing acceleration data structure, until the desired endpoint (e.g. a leaf node) of the ray tracing acceleration data structure traversal is reached and returned by the final ray tracing acceleration data structure lookup in the series of lookups.

Thus in an embodiment, the MMU when performing a ray tracing acceleration data structure traversal performs (and is configured to perform) one or more ray tracing acceleration data structure lookups in main memory, which lookups are performed using the memory management unit, page table walk, functionality and operation of the MMU. (As discussed, it is an advantage of the technology described herein that as the acceleration data structure traversals are performed by the MMU, any acceleration data structure traversals that miss in the MMU can correspondingly be processed more efficiently than if the ray tracing acceleration data structure traversal was being performed "outside" the MMU.)

Thus in an embodiment, the MMU performs (and is correspondingly configured to perform) one or more page table walks when performing a ray tracing acceleration data structure traversal, in order to retrieve data of a ray tracing acceleration data structure from main memory for use for the ray tracing acceleration data structure traversal. In particular, the MMU will perform a page table walk when an acceleration data structure traversal results in an MMU miss.

In an embodiment, the MMU performs the ray tracing acceleration data structure traversal in a similar and corresponding manner to the way that it performs a page table walk when performing a virtual to physical memory address translation. Thus the memory management unit in an embodiment comprises appropriate circuits to, and is configured to, perform a ray tracing acceleration data structure traversal in a similar manner to a page table walk.

The MMU may comprise any suitable and desired hardware (circuits) for performing a ray tracing acceleration data structure traversal, such as, and in an embodiment a ray tracing acceleration data structure traversing (walking) state machine, a memory interface, and as will be discussed further below, a cache or caches for caching partial and/or full ray tracing acceleration data structure traverses (walks), and ray tracing acceleration data structure entries.

The memory management unit could be provided with distinct and separate processing circuits for performing the ray tracing acceleration data structure traversal. However, in an embodiment, the ray tracing acceleration data structure traversal uses and shares circuits of the memory management unit that are also used to perform virtual to physical memory address translations and in particular, page table walks. Thus, in an embodiment, the memory management unit includes a circuit or circuits for performing a page table walk when translating a virtual memory address to a physical memory address, and that circuit or circuits or at least some or all of those circuits are used for and when performing a ray tracing acceleration data structure traversal for the purposes of the operation in the manner of the technology described herein.

Where necessary and/or desired, the memory management unit may also include a further circuit or circuits that may be used, e.g. in conjunction with the page table walk circuit or circuits, to perform and when performing a ray tracing acceleration data structure traversal.

The MMU in an embodiment comprises a local storage, e.g. a cache (a "result" cache) which it can use and is used to store the results of previous ray tracing acceleration data structure traversals. In an embodiment, this local storage is configured and used to store the results of one or more recently performed ray tracing acceleration data structure traversals locally in the MMU. This cache can be configured and operated in any suitable and desired manner, e.g. in accordance with the existing cache protocol for the MMU and/or graphics processing system in question.

This "result" cache should, and in an embodiment does, store the result(s) of previous ray tracing acceleration data structure traversals in the form that they would be provided to the graphics processor by the MMU (e.g., as discussed above, either indicating a branch/intermediate volume identified by the ray tracing acceleration data structure traversal, or identifying geometry in an "end" volume that has been identified by the ray tracing acceleration data structure).

In this case, the MMU in an embodiment operates to, and is in an embodiment configured to, when it receives a request to perform a ray tracing acceleration data structure traversal, first determine whether a result for the requested ray tracing acceleration data structure traversal is already stored in its local storage (the result cache), and if so, obtain and return the result for the ray tracing acceleration data structure traversal from that local storage (from the result cache). However, if the relevant ray tracing acceleration data structure traversal result is not present in the local storage (the result cache) of the MMU (such that a "miss" occurs), the MMU in an embodiment then operates to perform the ray tracing acceleration data structure traversal, and in an embodiment then stores the determined traversal result in the local storage (result cache), as well as returning the result to the graphics processor.

In an embodiment, the MMU also comprises local storage (e.g. a "traversal" cache) for storing information relating to one or more previous ray tracing acceleration data structure traversals which have (previously) been performed that is other than the final result of the traversal. For example information may be stored relating to the particular path taken through the ray tracing acceleration data structure (the particular ray tracing acceleration data structure traversal taken). In an embodiment, the MMU is configured to store, and stores, in local storage (a traversal cache) information for partial traversals.

In this case, the information that is cached for partial traversals in an embodiment comprises, for example, information relating to the branch of the acceleration data structure that was/is to be taken, such as, and in an embodiment, pointers to the next level of the data structure, and/or an indication of the volume that was reached (that the branch encompasses). Other arrangements would, of course, be possible.

Again, in this case, when requested to perform a ray tracing acceleration data structure traversal, as well as determining whether the result of that traversal is already stored in the "result" cache, it can be and is in an embodiment, correspondingly determined whether information for the traversal is otherwise stored in the "traversal" cache.

In this case, the MMU in an embodiment operates to, and is in an embodiment configured to, when it receives a request to perform a ray tracing acceleration data structure traversal, determine whether information for the requested ray tracing acceleration data structure traversal is already stored in its local storage (the traversal cache), and if so, obtain the information for the ray tracing acceleration data structure traversal from that local storage (from the traversal cache), and then perform any remaining part of the traversal based on, and using, the stored (cached) traversal information. However, if ray tracing acceleration data structure traversal information for the traversal in question is not present in the local storage (the traversal cache) of the MMU (such that a "miss" occurs), the MMU in an embodiment then operates to perform the ray tracing acceleration data structure traversal, and in an embodiment then stores information relating to the determined traversal in the local storage (traversal cache) of the MMU, as well as returning the result to the graphics processor (and in an embodiment storing the determined traversal result in the local storage (result cache) of the MMU, if present).

In this case, the determination of whether information for the ray tracing acceleration data structure traversal is already stored in the local storage (the traversal cache) is in an embodiment done only when, and in response to, it first being determined that a result for the requested ray tracing acceleration data structure traversal is not already stored in local storage (the result cache) of the MMU (as discussed above).

Thus in an embodiment, the MMU can cache partial and full ray tracing acceleration data structure traverses (walks), and, in an embodiment, ray tracing acceleration data structure entries.

In an embodiment, the MMU is configured to and operable to perform a plurality of ray tracing acceleration data structure traverses (for a plurality of different rays) in parallel (and simultaneously).

The local storage for information regarding traversals (the "traversal cache") could be logically and/or physically separate from the local storage for the traversal results (the "result" cache), or may be part of and stored in the same logical and/or physical storage. Correspondingly, the local storage for storing locally data relating to ray tracing acceleration data structure traversals could be logically and/or physically separate from the local storage (caches) used to store information relating to "normal" memory management unit operations (i.e. virtual to physical memory address translations, page table walks, etc.), or again, both types of data could be stored in and share the same logical and/or physical storage (cache).

In an embodiment, the memory management unit includes local storage (a cache) that can be used to store both virtual-to-physical memory address translation data and ray tracing acceleration data structure traversal data, with the cache being appropriately allocated to the different types of data as required and as desired, in use. This will then provide, for example, increased local storage capacity for virtual-to-physical memory address translation data when the memory management unit is not performing ray tracing acceleration data structure traversals.

As discussed above, in an embodiment, the graphics processor is operable to cache locally a result or results of a previous ray tracing acceleration data structure traversal that has been returned by the MMU. For example, the graphics processor could have local storage (a cache) that is configured to and operable to store ray tracing acceleration data structure traversal results returned by the MMU. In this case, the graphics processor could store locally a single (e.g. the most recent) ray tracing acceleration data structure traversal result returned by the MMU, or a plurality of such results, as desired, with the locally stored results being replaced and updated using a suitable replacement policy, such as a least recently used policy. Other arrangements would, of course, be possible.

Correspondingly, when the MMU returns the result of a ray tracing acceleration data structure traversal that it has performed, it in an embodiment returns that result to the ray tracing acceleration data structure traversal result local storage of the graphics processor, for it to be stored in the local storage from where it can then be retrieved and used by the programmable execution unit.

As discussed above, the result of a ray tracing acceleration data structure traversal that is returned by the MMU may solely comprise the end result (the end volume) (the leaf node) for the traversal. In this case, that end result (leaf node) will be stored in the ray tracing acceleration data structure traversal local storage of the graphics processor, and then used, for example, and in an embodiment, to perform an intersection test for the ray in question to determine if there is any defined geometry (in the end volume) (leaf node) that is actually intersected by the ray.

As discussed above, in an embodiment the MMU also returns as a result of a ray tracing acceleration data structure traversal that it has performed, information regarding, and in an embodiment indicating, and in an embodiment that allows repetition of, the traversal (walk) of the ray tracing acceleration data structure for the ray in question. In this case, the ray tracing acceleration data structure traversal for the ray is also stored (cached) in the local storage of the graphics processor, for example, and in an embodiment, together with an identifier (or a tag) that allows the appropriate ray parameters for the traversal in question to be determined (so that a sufficiently similar array for which the traversal can be reused can be identified (i.e. such that it can be identified whether the traversal can be reused for any given ray or not).

In this case, and as discussed above, in operation of the technology described herein, when the programmable execution unit determines that the determination of geometry that will be intersected by a ray is required when executing a program to render a frame using a ray tracing process, the programmable execution unit will first send a request (a message) to the local ray tracing acceleration data structure result storage to attempt to retrieve the result for the required ray tracing acceleration data structure traversal from that local storage, and when the required ray tracing acceleration data structure traversal result is already stored in the local storage, the result will be used (retrieved) from the local storage, without triggering the MMU to perform the (any) ray tracing acceleration data structure traversal, but when the required ray tracing acceleration data structure traversal result is not (is other than) stored in the local storage, the MMU will be triggered to perform at least a part of the required ray tracing acceleration data structure traversal, e.g., and in an embodiment, by the local ray tracing acceleration data structure traversal result storage sending a message to that effect to the MMU.

To do this, e.g., and in an embodiment, it will be determined for a new ray to be cast, whether that ray can be tested against a traversal already stored in the local storage, and, if so, the ray will be tested against the start of the stored (cached) traversal (e.g. against the root node of the traversal), and then the traversal continued through the locally stored (cached) data structure traversal either until the end of the traversal (the, e.g. leaf node (that will also be stored (cached) in the local storage)) is reached (in which case that result, leaf node can then be used for an intersection test for the new ray), or a divergence from the locally stored and returned traversal is encountered, in which case a new ray tracing acceleration data structure traversal for the ray in question will need to be, and is in an embodiment, triggered from the MMU (by the local storage triggering that appropriate new traversal by the MMU (in an embodiment by sending a message to that effect to the MMU)).

In an embodiment, the execution thread that requires the result of the ray tracing acceleration data structure is stalled while waiting for the traversal result to be returned (similarly to when attempting to read data from a cache). Then, when the ray tracing acceleration data structure traversal result has been returned, the thread is restarted. Other arrangements would, of course, be possible.

The local ray tracing acceleration data structure traversal result storage of the graphics processor can be provided and configured in any suitable and appropriate manner. In an embodiment, it is in the form of a ray tracing acceleration data structure traversal circuit that is able to communicate with and be controlled by the programmable execution unit (e.g. in response to the programmable execution unit executing instructions in a program that it is executing).

Such a ray tracing acceleration data structure traversal circuit (ray tracing acceleration data structure traversal result local storage circuit) could be configured simply to store the results of ray tracing acceleration data structure traversals returned by the MMU and provide those to the programmable execution unit as appropriate (and correspondingly trigger the MMU to perform required ray tracing acceleration data structure traversals where required). In this case, the ray tracing acceleration data structure traversal circuit may therefore, in effect, operate essentially as a cache for caching and that caches ray tracing acceleration data structure traversal results from the MMU. In one embodiment, this is the case.

However, it would also be possible for the ray tracing acceleration data structure traversal circuit to be operable to and configured to perform part of the ray tracing acceleration data structure traversal itself, if desired. This may particularly be desirable in the case where the result returned by the MMU is an intermediate result from the ray tracing acceleration data structure traversal (e.g. indicating an intermediate volume/branch that has been intersected by a ray), rather than the MMU returning the final result of the ray tracing acceleration data structure traversal. In this case, the ray tracing acceleration data structure traversal circuit will therefore, and in an embodiment does, complete the ray tracing acceleration data structure traversal from the point at which the MMU finished.

In this case, the ray tracing acceleration data structure traversal circuit of the graphics processor should be, and is in an embodiment, a (substantially) fixed-function hardware unit (circuit) that is configured to perform (part of) a traversal of a ray tracing acceleration data structure to determine geometry for a scene to be rendered that may be intersected by a ray being used for a ray tracing operation. The ray tracing acceleration data structure traversal circuit should thus comprise an appropriate fixed function circuit or circuits to perform the required operations, although it may comprise and have some limited form of configurability, in use, e.g. if desired.

The ray tracing acceleration data structure traversal circuit could be configured to perform the ray tracing acceleration data structure traversal in any suitable and desired manner, e.g., and in an embodiment, in dependence upon the form of ray tracing acceleration data structure or structures that could be or will be used.

In an embodiment, the ray tracing acceleration data structure traversal circuit is configured to traverse a ray tracing acceleration data structure in a similar manner to a page table walk in a memory management unit (MMU). Thus, in an embodiment, the ray tracing acceleration data structure traversal circuit has a ray tracing acceleration data structure traversing (walking) state machine, a memory interface, and can cache partial and full ray tracing acceleration data structure traverses (walks), and ray tracing acceleration data structure entries.

In an embodiment, the ray tracing acceleration data structure traversal circuit is configured to and operable to perform a plurality of acceleration data structure traverses (for a plurality of different rays) in parallel (and simultaneously).

In one embodiment where the ray tracing acceleration data structure traversal circuit is configured to perform a traversal of a ray tracing acceleration data structure to determine geometry that may be intersected by a ray, it does not (and is not configured to) perform any actual intersection of the geometry with the ray itself (so the ray tracing acceleration data structure traversal circuit does not determine the intersection itself, but rather traverses the ray tracing acceleration data structure to determine geometry that a ray should be intersection-tested against, without performing the intersection test itself).

In another embodiment, the ray tracing acceleration data structure traversal circuit is configured to perform and determine the actual intersection of the geometry with the ray itself (if any) (so the ray tracing acceleration data structure traversal circuit is configured to and operates to determine the intersection itself (performs the intersection test itself)). This could be the case whether the ray tracing acceleration data structure traversal circuit performs any part of the traversal as well, or simply receives and stores locally the result of the (entire) traversal performed by the MMU.

In this case therefore, the ray tracing acceleration data structure traversal circuit will perform a determination of whether the ray intersects any geometry defined for the scene, and then return the result of that intersection test to the programmable execution unit as appropriate.

There may be a single or plural ray tracing acceleration data structure result local storages, e.g. ray tracing acceleration data structure traversal circuits, e.g. such that plural programmable execution units share a given (or a single) ray tracing acceleration data structure traversal result local storage/circuit, and/or such that a given programmable execution unit has access to and can communicate with and use plural different ray tracing acceleration data structure traversal local storages/circuits. Where there are plural ray tracing acceleration data structure traversal local storages/circuits, each such storage/circuit can in an embodiment operate in the above manner(s).

Once the MMU (or MMU and ray tracing acceleration data structure traversal circuit) has completed the traversal of a ray tracing acceleration data structure or structures for a ray, then the result of the traversal should be, and is in an embodiment, used to determine how to further process (e.g. render) the sampling position that the ray relates to. This further processing may be done (all or in part) by the programmable execution unit and/or a ray tracing acceleration data structure traversal circuit, as discussed above.

In the case where the result of the traversal of the ray tracing acceleration data structure(s) for a ray is that there is no geometry that the ray could potentially intersect (i.e. the result of the ray tracing acceleration data structure traversal is a "miss"), then in an embodiment, in response to such a "miss" response from the traversal operation (e.g. from the MMU), the further processing for the sampling position in question comprises, e.g., and in an embodiment, the programmable execution unit, performing an appropriate particular, in an embodiment selected, in an embodiment predefined, "default" operation for further processing for the sampling position in question in response to that event. This could comprise, for example, assuming intersection with a bounding volume or skybox or computing a procedural colour for the background, or reporting a visibility flag (no intersection found along the particular path defined by the ray), etc. The programmable execution unit (e.g.) will then shade the sampling position accordingly.

Thus, in the case where there was no geometry for the scene that may be intersected by the ray in question, in an embodiment a particular, in an embodiment selected, in an embodiment predefined, "default" processing operation that is, e.g., and in an embodiment, predefined for use in the event that there is no "active" defined geometry for the scene found to potentially be intersected by the ray in question, is performed.

In one embodiment, the "default" processing operation that is performed where a ray does not intersect any "actively" defined geometry for the scene comprises using particular, in an embodiment selected, in an embodiment predefined, "default" geometry to be used and considered in that event. In this case, the predefined, default geometry in an embodiment indicates at least a default, predefined surface type for the geometry and/or the position for the geometry. The surface type may, e.g., be predefined as a "bounding" surface that bounds the scene and that is to be used for rays that pass through the scene without intersecting any otherwise defined geometry for the scene.

The "default" processing operation that is performed where a ray does not intersect any "actively" defined geometry may instead comprise reporting a "miss", in an embodiment without additional operation. Such a "miss" report may be used for visibility determination, for example.

On the other hand, where the ray tracing acceleration traversal determines that there may be geometry that is intersected by the ray, and thus returns an indication of geometry that may be intersected by a ray, then in an embodiment, in response to such a "potential intersection" response from the traversal operation (e.g. from the MMU), the further processing for the sampling position in question comprises (first) performing an intersection test to determine whether any of the geometry determined by the traversal to be potentially intersected by the ray is actually intersected by the ray.

Thus, in an embodiment, where the ray tracing acceleration data structure traversal returns an indication of geometry that may be intersected by a ray, an intersection test that uses the indicated geometry determined by the ray tracing acceleration data structure traversal is performed to determine any geometry that is (actually) intersected by the ray (to determine if any of the geometry indicated by and returned by the ray tracing acceleration data structure traversal is (actually) intersected by the ray).

As discussed above, in one embodiment, this intersection test is done using a ray tracing acceleration data structure traversal circuit (hardware accelerator), and in another embodiment, this intersection test is done by the programmable execution unit.

Thus, in an embodiment, once the ray tracing acceleration data structure traversal has returned the appropriate geometry information for a ray, the indicated geometry determined by the ray tracing acceleration data structure traversal is used to determine any geometry that is intersected by the ray. Thus, for example, and in an embodiment, the programmable execution unit will itself perform the actual intersection tests and determinations using, and based on, the geometry indicated by the ray tracing acceleration data structure traversal.

The intersection determination can be performed in any suitable and desired manner, and can use the information returned by the ray tracing acceleration data structure traversal as appropriate and desired. Thus it will, in an embodiment, use the indication of geometry that may be intersected by the ray to test whether the geometry is actually intersected by the ray, together with any other properties, such as surface properties, indicated for the geometry that may affect intersection of the ray or the operation that is required.

It should be noted in this regard that while the intersection test will, and in an embodiment does, use the indicated geometry to determine the geometry that is intersected by a ray, as the ray tracing acceleration data structure traversal only returns an indication of geometry that may be intersected by the ray (e.g. that is present in a volume that the ray intersects (passes into/through), it could be that in fact the ray will not actually intersect any of the indicated geometry. Thus while the determination of any geometry that is intersected by a ray performed by the intersection test may, and typically will, result in the identification of geometry that is actually intersected by the ray, it could be the case that the intersection determination, e.g. performed by the programmable execution unit, will in fact determine that there is in fact no geometry that is intersected by the ray.

In the case that the intersection determination determines that there is in fact no geometry that is intersected by the ray (e.g. when the ray tracing acceleration data structure traversal returns a set of primitives, but none of the primitives is actually intersected by the ray), then the intersection test in an embodiment treats that as a ray tracing intersection "miss" (as discussed above for the situation where the ray tracing acceleration data structure traversal does not identify any potential geometry intersection for a ray) (with the appropriate "miss" "default" operation (as discussed above) then potentially being performed accordingly).

It will be appreciated in this regard that a "miss" should only be, and is in an embodiment only, determined (reported) when all the possible branches of the ray tracing acceleration data structure have been traversed and resulted in a "miss". Determining a "miss" of a single leaf node is not sufficient to determine a miss for a whole ray tracing acceleration data structure, so when a leaf node is "missed", the traversal should, and in an embodiment does, carry on until all potentially intersected leaf nodes have been visited (and when all the leaf nodes have been visited and "missed", a "miss" can be determined for the traversal).

On the other hand, if (when) the intersection determination (test) determines that there is geometry that the ray will actually intersect, then further processing for the sampling position in the frame that the ray corresponds to in accordance with the geometry for the scene determined to be intersected by the ray is in an embodiment performed. This further processing is in an embodiment done by the programmable execution unit.

The further processing for a sampling position that is performed in this regard can comprise any suitable and desired processing for the sampling position as a result of the ray tracing operation for the ray in question, e.g., and in an embodiment, in accordance with and based on the geometry for the scene that was determined to be intersected by the ray.

The further processing for a sampling position that is performed as a result of the ray tracing operation for a ray is in an embodiment determined and selected in accordance with and based on the geometry of the scene that was determined to be intersected by the ray, and/or in accordance with and based on the particular ray tracing-based rendering process that is being performed (e.g. whether the ray tracing process requires the casting of secondary rays (where it is appropriate to do that), and/or the casting of secondary rays of a particular type, or whether the ray tracing-based rendering is intended to be based solely on the first intersection point that is determined). For example, the further processing could be, and in an embodiment is, based on the determined surface type of the geometry that is intersected, and a predefined operation (e.g. in terms of the casting of any secondary rays) for that surface type.

Other arrangements would, of course, be possible.

In an embodiment, the further processing for a sampling position that can be (and is) performed in accordance with any geometry for the scene determined to be intersected by a ray corresponding to the sampling position comprises triggering the casting of a further (e.g. secondary) ray into the scene for the sampling position in question.

In an embodiment, the further processing for a sampling position in the frame that a ray corresponds to that can be (and is) performed in accordance with any geometry for the scene determined to be intersected by the ray also or instead (and in an embodiment also) comprises rendering (shading) the sampling position for the frame to generate an output data value (colour value) for the sampling position, e.g., and in an embodiment, to be used to display the view of the scene at the sampling position for the frame in question.

Thus, in an embodiment, the further processing for a sampling position in a frame that a ray corresponds to that is performed comprises one of:
  triggering the tracing (casting) of a further (e.g. secondary) ray for the sampling position in question; and
  rendering (shading) the sampling position so as to provide an output colour value for the sampling position for the frame.

Correspondingly, the technology described herein in an embodiment comprises shading the sampling position based on the intersection, and/or casting further rays into the scene based on the intersection.

As discussed above, which of these operations is performed is in an embodiment based on and in accordance with a property or properties of the geometry that was determined to be intersected by the ray, and the particular ray tracing-based rendering process that is being used.

In the case that, in response to determining that there is geometry that is intersected by a ray (and the geometry that is intersected by a ray), it is determined that a further ray should be cast into the scene, then the casting of the further ray is in an embodiment done by the programmable execution unit (again) sending an appropriate message to the MMU (either directly or via local storage, etc.), to then perform the appropriate ray tracing acceleration data structure traversals for the new ray for the sampling position in question.

Thus, in embodiments at least, there may be an iterative process of casting a ray, the MMU traversing a ray tracing acceleration data structure(s) for the ray, the, e.g. programmable execution unit, determining that there is geometry that is intersected by the ray, and then triggering the traversal of a ray tracing acceleration data structure by the MMU for a further ray for the sampling position in question, and so on.

In the case that in response to it being determined that there is geometry that is intersected by ray (and the geometry that is intersected by a ray), it is determined that the sampling position that the ray corresponds to should be shaded (rendered) so as to provide an output colour value for the sampling position for the frame, then the programmable execution unit in an embodiment executes instructions so as to provide an output, colour value for the sampling position in question.

The rendering (shading) of the sampling position can be performed in any suitable and desired manner. In an embodiment, it is performed based on and in accordance with the results of the casting of the ray or rays for the sampling position, and the determined intersected geometry (if any), and/or based on and in accordance with the particular ray tracing-based rendering process that is being performed. For example, the rendering (shading) processing could be, and in an embodiment is, based on the determined surface type of the geometry that is intersected, and a predefined shading operation for that surface type.

The rendering (shading) in an embodiment takes account of all the rays that have been cast for a sampling position and so in an embodiment is based both on the first intersected geometry (and the properties, e.g. surface properties, of that geometry), together with the result of any further (secondary) rays that have been cast for the sampling position, e.g. to determine any lighting, reflection or refraction effects.

Other arrangements would, of course, be possible.

In an embodiment, the rendering (shading) of the sampling position is performed once all of the (desired) rays have been cast for the sampling position (and the geometry intersections (if any) for all of the rays to be cast for the sampling position in question have been determined). (As discussed above, the ray tracing process for a given sampling position may comprise both the determination of any geometry that is intersected by a "primary" ray that has been cast from the sampling position itself, together with the determination of geometry, etc., for any secondary rays that have been cast for the sampling position in question, e.g. as a result of an intersection or intersections determined for the primary ray.)

Thus, in an embodiment, once the final results of the rays (the geometry intersections (if any)) have been determined for a sampling position, the programmable execution unit will then render the sampling position in the frame, (at least) in accordance with any geometry for the scene determined to be intersected by rays that have been cast for the sampling position.

Again, this can be done in any suitable and desired manner, and can use any suitable and desired properties, etc., of the geometry, etc., that is determined to be intersected by a ray or rays for the sampling position.

The programmable execution unit can perform and be triggered to perform the determination of any geometry intersected by a ray, and/or the appropriate further processing for a sampling position accordingly, in response to the result of a ray tracing acceleration data structure traversal, in any suitable and desired manner. In an embodiment, the programmable execution unit performs these operations, and is triggered to perform these operations, by executing, and being triggered to execute, further processing instructions that will cause the programmable execution unit to perform the required processing operations.

Thus, in an embodiment, once an indication of geometry that may be (or that is) intersected by a ray is available, the programmable execution unit is caused to execute further processing instructions, e.g., and in an embodiment, that will cause the programmable execution unit to perform the required processing operations, including (if necessary) determining any geometry intersected by the ray, and then the appropriate further processing for the sampling position in accordance with any geometry for the scene determined to be intersected by the ray.

Thus, when a response from a ray tracing acceleration data structure traversal is available, the programmable execution unit in an embodiment executes further shader program instructions to perform the desired geometry intersection determination and/or consequent further processing for the sampling position in question.

In an embodiment, there are different sets of further instructions to be executed in dependence upon the type of geometry that has been determined and is indicated by the ray tracing acceleration data structure traversal as (potentially) being intersected by a ray. Thus, in an embodiment, there are different (sets) (sequences) of instructions that will be executed by the programmable execution unit in accordance with, and in dependence upon, the particular geometry, and in an embodiment the particular surface type (surface property or properties) of the geometry, indicated by the ray tracing acceleration data structure traversal.

The different sets of instructions to be executed for different types of geometry (e.g. surfaces) could, e.g., be provided as a set of plural different shader programs to be executed (in dependence upon the indicated geometry) (and in one embodiment that is the case), or they could be different sequences (sets) of instructions (e.g. sub-routines) within an overall, larger, shader program that includes sequences (sets) of instructions for each of the different geometry types that are to be treated differently to each other.

Thus, there are in an embodiment a plurality of different "surface processing" routines (shader programs) that will be selected from for execution by the programmable execution unit in accordance with, and based on, the indicated geometry that may be intersected by a ray returned by the ray tracing acceleration data structure traversal.

Thus, in an embodiment, the operation in the manner of the technology described herein comprises, and the graphics processor (e.g. the programmable execution unit) is configured to, in response to an indication of geometry that may be intersected by a ray from the ray tracing acceleration data structure traversal, selecting a sequence of instructions (e.g. a shader program) to be executed by the programmable execution unit to cause the programmable execution unit to determine any geometry that is intersected by a ray and/or perform further processing for the sampling position that the ray corresponds to, in dependence upon a property or properties, and in an embodiment a surface type, of the indicated geometry returned by the ray tracing acceleration data structure traversal (with the programmable execution unit then executing the sequence of instructions (e.g. shader program) to use the indicated geometry determined by the ray tracing acceleration data structure traversal circuit to determine any geometry that is intersected by a ray and/or then perform further processing for the sampling position that the ray corresponds to, accordingly).

As the programmable execution unit continues its processing (for a sampling position) when it receives a response from the ray tracing acceleration data structure traversal by executing further shader program instructions, it would be possible in this regard for the further program instructions to be executed by the original (the originating) execution thread that triggered the message to, and the operation of, the ray tracing acceleration data traversal for the ray and sampling position in question (and in an embodiment, this is what is done).

In this case therefore, an initial thread, e.g. for a sampling position in the frame, will execute an initial sequence of instructions for the ray tracing rendering process that will, as part of that operation, trigger a message to the MMU, etc. (as appropriate) to perform a ray tracing acceleration data structure traversal for a ray, with the thread that is executing the program then, e.g., being stalled when and while the ray tracing acceleration data structure traversal is required, until the result of the ray tracing acceleration data structure traversal is returned, with the (original) thread then resuming execution of shader program instructions at that point to execute the instructions that perform the ray intersection determination and any consequent further processing for the sampling position, etc.

Thus the execution thread that originally casts the ray, when it receives the intersect information/the ray tracing acceleration data structure traversal result, would then carry on, and, where required, perform an intersection test, etc. Depending upon the surface type and the number of times the ray has bounced there may then be zero (for example if the surface is non-reflective), one (for example if the surface is a mirror), or more (for example if the surface is diffuse, etc.) secondary rays cast. The subsequent (secondary) rays could all be new execution threads.

It would also or instead be possible for a new execution thread to be generated (spawned) and used to execute (and to trigger the execution of) the necessary program instructions once the ray tracing acceleration data structure traversal has returned an indication of geometry that may be intersected by a ray.

Thus, in this case, a first thread will execute the program instructions to perform the ray tracing-based rendering process up and until a message is sent to the MMU, etc., for it to perform a ray tracing acceleration data structure traversal for a ray, with that initial thread then being retired at that point.

Then, when the result of the ray tracing acceleration data structure traversal is available from the MMU, etc., a new thread will be generated (spawned), and execute the relevant sequence of instructions (e.g. shader program) to perform the necessary ray intersection determination and the further processing for the sampling position in question in response to the result of the ray intersection determination.

In these cases, any new thread should be, and is in an embodiment, generated (spawned) in accordance with the information returned by the ray tracing acceleration data structure traversal and/or relating to the ray being cast, thus, e.g., in accordance with, and based on, one or more of: the indicated surface type, surface normal, position and/or distance vectors, etc.

To facilitate these operations, in an embodiment, the programmable execution unit, the MMU, and/or local result storage of the graphics processor (e.g. a ray tracing acceleration data structure traversal circuit), as appropriate, in an embodiment comprises, and/or is in communication with, an appropriate thread spawner (thread generating circuit), so that it can trigger the generation of new execution threads to be executed by the programmable execution unit when, and in response to, the ray tracing acceleration data structure traversal completing the traversal of a ray tracing acceleration data structure for a ray, etc.

Other arrangements would, of course, be possible.

As discussed above, in an embodiment of the technology described herein at least, different sets of "surface processing" program instructions (e.g. different shader programs) will be executed in dependence upon the geometry, and in particular a property or properties (and in an embodiment a surface property and/or type) of the geometry found to be intersected by a ray.

In view of this, in an embodiment, the programmable execution unit can be, and is in an embodiment, caused to execute a given particular set of "surface processing" instructions (shader program) for plural "returned rays" together (i.e. in parallel and/or one after another). This will then have the effect of helping to increase shader instructions/shader program and/or shader program data locality, and make the shader program execution more efficient.

Thus, in an embodiment, there are plural different sets of "surface processing" program instructions (different shader programs) to be executed for different types of geometry (e.g.), and in an embodiment for different geometry surface types, and the further processing for sampling positions in response to the results of ray traversals returned by the ray tracing acceleration data structure traversal can be, and is in an embodiment, grouped together based on the particular set of instructions (e.g. shader program) that is to be executed to continue the processing for the sampling positions based on the results of the ray traversal.

Thus, ray intersection determinations are in an embodiment grouped for execution together based on one or more particular, in an embodiment selected, in an embodiment predefined criteria, such as one or more of, and in an embodiment all of: the surface type for the geometry to be processed for the rays; the positions for the rays; and the directions (direction vectors) of the rays.

In order to facilitate this operation, a "pool" of ray intersection determinations that are waiting to "execute" "surface processing" instructions (programs) is in an embodiment maintained (e.g. in an appropriate queue or buffer (cache) associated with the ray tracing acceleration data structure traversal circuit), with groups of one or more ray intersection determinations then being selected from that pool for processing, e.g., and in an embodiment, based on one or more or all of the criteria discussed above. This will then facilitate identifying and executing ray intersection determinations that are to execute the same "surface processing" program together.

In this case, ray intersection determinations that are in the "pool" and that are waiting to execute a "surface processing" shader program in an embodiment have their duration in the pool (their "ages") tracked, with any ray intersection determinations whose duration in the pool exceeds a particular, in an embodiment selected, in an embodiment predetermined, threshold duration ("age"), then being prioritised for execution, e.g., and in an embodiment, without waiting any further for later, "similar" ray intersection determinations to arrive for processing.

Other arrangements would, of course, be possible.

Once a group of ray intersection determinations to be executed together have been selected, then the programmable execution unit should be triggered to execute the "surface processing" shader program for the group of ray intersection determinations together as a group. This can be done in any suitable and desired manner.

In an embodiment this is done by triggering the generation (spawning) of a corresponding group of execution threads, and issuing those threads to execute the "surface processing" shader program accordingly. This is in an embodiment done by submitting the selected group of ray intersection determinations to a thread generator (spawner), to then trigger the generation of the required corresponding group of execution threads for execution.

The threads of the group of execution threads will then be triggered to, and will execute, the "surface processing" shader program together as a group.

In the case where the programmable execution unit supports executing only one thread at a time, then the group of threads is in an embodiment executed together by the programmable execution unit by the programmable execution unit executing each thread of the group in turn, immediately one after another.

On the other hand, where the programmable execution unit can execute for plural threads in parallel (simultaneously), then the executions for some or all of the threads of the group can be, and are in an embodiment, performed in parallel.

In order to perform the intersection test and any required subsequent processing, the programmable execution unit and/or ray tracing acceleration data structure traversal circuit may, and in an embodiment does, use further information relating to the geometry (e.g. primitives), such as appropriate attributes of the geometry (e.g. primitives), such as their vertex positions, normals, surface type/materials, etc. This may be needed in order to determine the actual intersection (point), and for performing further processing in relation to the sampling position accordingly.

Thus the process in an embodiment uses information regarding the properties of the geometry (e.g. in terms of its surface properties, the surface it belongs to, etc.). This information can be provided in any suitable and desired manner, but in an embodiment indexes/pointers to data structures where the data relating to the properties of the geometry is stored are used.

In an embodiment, these properties (additional attributes) are fetched by the programmable execution unit and/or ray tracing acceleration data structure traversal circuit as appropriate, once a traversal determination has been returned by the MMU, or MMU and ray tracing acceleration data structure traversal circuit (e.g. by executing further program instructions to fetch the required attributes).

It would also or instead be possible, if desired, for the indication of the geometry for the scene to be rendered that may be intersected by the ray that is returned by the ray tracing acceleration data structure traversal to, as well as indicating the geometry itself, convey and/or indicate such information regarding the properties of the geometry, e.g. in the form of indexes/pointers to data structure(s) where data relating to the properties of the geometry is stored.

In an embodiment, the ray tracing rendering process supports the use of plural different geometry models, e.g., and in an embodiment, in dependence of the distance of the geometry from the viewpoint (camera), and/or from any lighting for the scene, etc., and the ray tracing acceleration data structure traversal returns with the indicated geometry an indication of which one of the different models should be used for the geometry.

Other arrangements would, of course, be possible.

Once the ray tracing based rendering process has been completed for a sampling position, then that will, and in an embodiment does, as discussed above, generate an appropriate set of output data for the sampling position, e.g., and in an embodiment, in the form of an appropriate set of colour (e.g. RGB) data, for the sampling position.

This will be done for each sampling position in the frame (thus the operation in the manner of the technology described herein is in an embodiment performed for plural, and in an embodiment for each, sampling position of the frame being rendered), so that a final output frame showing a view of the scene to be rendered will be generated, which output frame can then, e.g., be written out to memory and/or otherwise processed for further use, e.g. for display on a suitable display.

The process may then be repeated for a next frame (e.g. the next frame to be displayed), and so on.

As discussed above, the MMU will be triggered to perform at least part of a ray tracing acceleration data structure traversal when the programmable execution unit is executing a shader program that performs a ray tracing-based rendering process.

The sending of a message/command to the MMU to cause the MMU to perform at least part of a ray tracing acceleration data structure traversal can be implemented and triggered in any desired and suitable manner. In an embodiment, this is achieved by including an appropriate instruction in the ray tracing rendering shader program to be executed by the programmable execution unit that will trigger the (process of the) sending of an appropriate message to the MMU (where required) (with the execution unit then triggering the (process for the) sending of the message when it reaches (executes) the relevant instruction in the shader program).

Thus, a graphics shader program or programs, including a set (sequence) of program instructions that when executed will perform the desired ray tracing rendering process, and that includes one or more instructions that when executed will cause the programmable execution unit to trigger the (process for the) sending of a message to the memory management unit (MMU) to cause the MMU to perform at least part of a traversal of a ray tracing acceleration data structure for a scene for a ray to determine geometry for the scene that may be intersected by the ray, will be issued to the graphics processor and executed by the programmable execution unit.

The shader program(s) may include only instructions necessary for performing the particular ray tracing based rendering operations, or it may also include other instructions, e.g. to perform other shading operations, if desired.

Subject to the particular operation in the manner of the technology described herein, the execution of the shader program to perform the desired ray tracing process can otherwise be performed in any desired and suitable manner, such as, and in an embodiment, in accordance with the execution of shader programs in the graphics processor and graphics processing system in question.

Thus, for example, and in an embodiment, when executing the ray tracing shader program, the graphics processor will operate to spawn (issue) respective execution threads for the sampling positions of the frame being rendered, with each thread then executing the program(s) so as to render the sampling position that the thread represents (and corresponds to). The graphics processor accordingly in an embodiment comprises a thread spawner (a thread spawning circuit) operable to, and configured to, spawn (issue) execution threads for execution by the programmable execution unit.

Then, when executing the ray tracing shader program and a "traversal" instruction falls to be executed, the programmable execution unit, when it executes the "traversal" instruction will trigger the process for the sending of a message to the memory management unit to cause the memory management unit to perform at least part of a traversal of a ray tracing acceleration data structure for a ray to determine geometry for the scene that may be intersected by the ray.

As discussed above, the process for the sending of a message to the MMU to perform at least part of a ray tracing acceleration data structure traversal that is performed when the "ray traversal" instruction is executed could comprise simply sending a message directly to the MMU to that effect, or it could, and in embodiments does, comprise first determining whether the required ray tracing acceleration data structure traversal result is present in local storage (a cache) of the graphics processor, and then, if necessary and appropriate, a message being sent to the MMU to perform the ray tracing acceleration data structure traversal.

The ray tracing rendering shader program(s) that is executed by the programmable execution unit can be prepared and generated in any suitable and desired manner.

In an embodiment, it or they is generated by a compiler (the shader compiler) for the graphics processor of the graphics processing system in question (and thus the processing circuit that generates the shading program in an embodiment comprises an appropriate compiler circuit). The compiler is in an embodiment executed on an appropriate programmable processing circuit of the graphics processing system.

The compiler (the compiler processing circuit) is in an embodiment part of, and in an embodiment executes on, a central processing unit (CPU), such as a host processor, of the graphics processing system, and is in an embodiment part of a driver for the graphics processor that is executing on the CPU (e.g. host processor).

In this case, the compiler and compiled code will run on separate processors within the overall graphics processing system. However, other arrangements would be possible, such as the compiler running on the same processor as the compiled code, if desired.

The compilation process (the compiler) can generate the ray tracing rendering shader program in any suitable and desired manner, e.g., and in an embodiment, using any suitable and desired compiler techniques for that purpose.

In an embodiment, a "ray traversal" instruction is included in the ray tracing rendering shader program that is to be executed by the graphics processor by the compiler in response to an appropriate ray tracing indication (e.g. a "trace( )" call), included in the (high level) shader program that is provided by the application that requires the graphics processing. Thus, e.g., and in an embodiment, an application program will be able to include an explicit indication of a need for a ray tracing operation, with the compiler then, in the technology described herein, including an appropriate "ray traversal" instruction in the compiled shader program in response to that. It may also be possible for the compiler to include a "ray traversal" instruction of its own accord, e.g. in the case where the compiler is able to assess the shader program being compiled to identify when and where to include a "ray traversal" instruction or instructions, even in the absence of an explicit indication of that.

Other arrangements would, of course, be possible.

In an embodiment, the compiler analyses the shader program code that is provided, e.g. by the application on the host processor that requires the graphics processing, and includes a ray traversal instruction or instructions at the appropriate point(s) in the shader program (e.g. by inserting the instruction(s) in the (compiled) shader program).

The technology described herein also extends to and includes such operation of a compiler.

Thus, a further embodiment of the technology described herein comprises a method of compiling a shader program to be executed by a programmable execution unit of a graphics processor that is operable to execute graphics processing programs to perform graphics processing operations;

the method comprising:

including in a shader program to be executed by a programmable execution unit of a graphics processor when rendering a frame that represents a view of a scene comprising one or more objects using a ray tracing process:

an instruction that when executed will cause the programmable execution unit to trigger a process for the sending of a message to a memory management unit that is operable to perform at least part of a traversal of a ray tracing acceleration data structure indicative of the distribution of geometry for a scene to be rendered to determine geometry for a scene to be rendered that may be intersected by a ray being used for a ray tracing operation, to cause the memory management unit to perform at least part of a traversal of a ray tracing acceleration data structure for a scene for a ray to determine geometry for the scene that may be intersected by the ray.

A further embodiment of the technology described herein comprises a compiler for compiling a shader program to be executed by a programmable execution unit of a graphics processor that is operable to execute graphics processing programs to perform graphics processing operations;

the compiler comprising a processing circuit configured to:

include in a shader program to be executed by a programmable execution unit of a graphics processor when rendering a frame that represents a view of a scene comprising one or more objects using a ray tracing process:

an instruction that when executed will cause the programmable execution unit to trigger a process for the sending of a message to a memory management unit that is operable to perform at least part of a traversal of a ray tracing acceleration data structure indicative of the distribution of geometry for a scene to be rendered to determine geometry for a scene to be rendered that may be intersected by a ray being used for a ray tracing operation, to cause the memory management unit to perform at least part of a traversal of a ray tracing acceleration data structure for a scene for a ray to determine geometry for the scene that may be intersected by the ray.

As will be appreciated by those skilled in the art, these embodiments of the technology described herein can, and in an embodiment do, include any one or more or all of the features of the technology described herein described herein, as appropriate.

Thus, for example, the shader program or programs that are prepared by the compiler in an embodiment comprise a first sequence of instructions to perform appropriate graphics processing operations for a ray tracing-based rendering process up to and including the instruction that triggers the process for the sending of a message to the MMU to perform a ray tracing acceleration data structure traversal for a ray, together with one or more sequences of instructions to be executed once a result from the ray tracing acceleration data structure traversal has been received (and, in an embodiment, to be executed in dependence upon the result from the ray tracing acceleration data structure traversal, such as the geometry/surface type), which sequences of instructions will, when executed, determine any geometry that is intersected by a ray using a determined indication of the geometry returned by the ray tracing acceleration data structure traversal, and then trigger further processing in respect of a sampling position that the ray corresponds to accordingly (which further processing in an embodiment may be the casting of a further ray, and/or the rendering (shading) of the sampling position that the ray corresponds to).

Other arrangements would, of course, be possible.

The technology described herein can be used for all forms of output that a graphics processor may output. Thus, it may be used when generating frames for display, for render-to-texture outputs, etc. The output from the graphics processor is, in an embodiment, exported to external, e.g. main, memory, for storage and use.

Subject to the requirements for operation in the manner of the technology described herein, the graphics processor can otherwise have any suitable and desired form or configuration of graphics processor and comprise and execute any other suitable and desired processing elements, circuits, units and stages that a graphics processor may contain, and execute any suitable and desired form of graphics processing pipeline.

The communication between the MMU, local storage(s), ray tracing acceleration data structure traversal circuit(s), and the programmable execution unit, etc., can be facilitated as desired. There is in an embodiment an appropriate communication (messaging) network for passing messages between the various units. This communication (messaging) network can operate according to any desired communications protocol and standard, such as using a suitable interconnect/messaging protocol.

As well as the ray tracing acceleration data structure traversal circuit (if present), there may also be other accelerators (special purpose units) that are able to communicate with the programmable execution unit, such as a load/store unit (circuit), an arithmetic unit or units (circuit(s)), a texture mapper, etc., if desired.

In an embodiment, the graphics processor is part of an overall graphics (data) processing system that includes, e.g., and in an embodiment, a host processor (CPU) that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and, in an embodiment does, also execute a driver for the graphics processor and a compiler or compilers for compiling programs to be executed by the programmable execution unit of the graphics processor.

The overall graphics processing system may, for example, include one or more of: a host processor (central processing unit (CPU)), the graphics processor (processing unit), a display processor, a video processor (codec), a system bus, and a memory controller.

The graphics processor and/or graphics processing system may also comprise, and/or be in communication with, one or more memories and/or memory devices that store the data described herein, and/or the output data generated by the graphics processor, and/or store software (e.g. (shader) programs) for performing the processes described herein. The graphics processor and/or graphics processing system may also be in communication with a display for displaying images based on the data generated by the graphics processor.

It will be appreciated by those skilled in the art that all of the described embodiments of the technology described herein can, and in an embodiment do, include, as appropriate, any one or more or all of the features of the technology described herein described herein.

The technology described herein can be implemented in any suitable system, such as a suitably configured microprocessor based system. In an embodiment, the technology described herein is implemented in a computer and/or micro-processor based system. The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, unless otherwise indicated, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuitry/circuits), and/or programmable hardware elements (processing circuitry/circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages, etc., may share processing circuitry/circuits, etc., if desired.

The methods in accordance with the technology described herein may be implemented at least partially using software e.g. computer programs. It will thus be seen that when viewed from further embodiments the technology described herein provides computer software specifically adapted to carry out the methods herein described when installed on one or more data processors, a computer program element comprising computer software code portions for performing the methods herein described when the program element is run on one or more data processors, and a computer program comprising code adapted to perform all the steps of a method or of the methods herein described when the program is run on a data processing system. The data processor(s) may be a microprocessor system, a programmable FPGA (field programmable gate array), etc.

The technology described herein also extends to a computer software carrier comprising such software which when used to operate a display processor, or microprocessor system comprising one or more data processors causes in conjunction with said data processor(s) said controller or system to carry out the steps of the methods of the technology described herein. Such a computer software carrier could be a physical storage intermediate such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory intermediate, such as a computer readable intermediate, for example, diskette, CD ROM, ROM, RAM, flash memory, or hard disk. It could also comprise a series of computer readable instructions transmittable to a computer system, via a modem or other interface device, over either a tangible intermediate, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable intermediate with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

The present embodiments relate to the operation of a graphics processor, e.g. in a graphics processing system as illustrated in FIG. 1, when performing rendering of a scene to be displayed using a ray tracing based rendering process.

Ray tracing is a rendering process which involves tracing the paths of rays of light from a viewpoint (sometimes referred to as a "camera") back through sampling positions in an image plane (which is the frame being rendered) into a scene, and simulating the effect of the interaction between the rays and objects in the scene. The output data value e.g. colour of a sampling position in the image is determined based on the object(s) in the scene intersected by the ray passing through the sampling position, and the properties of the surfaces of those objects. The ray tracing process thus involves determining, for each sampling position, a set of objects within the scene which a ray passing through the sampling position intersects.

Figure 2:
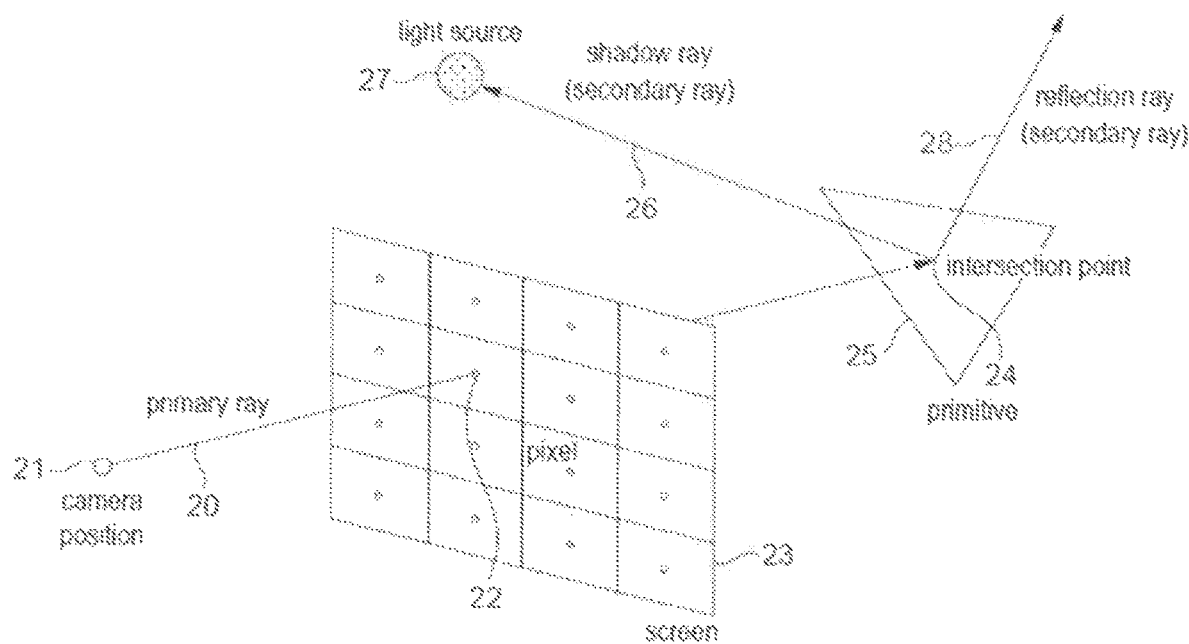
FIG. 2 is a schematic diagram illustrating a "full" ray tracing process.

FIG. 2 illustrates an exemplary "full" ray tracing process. A ray 20 (the "primary ray") is cast backward from a viewpoint 21 (e.g. camera position) through a sampling position 22 in an image plane (frame) 23 into the scene that is being rendered. The closest point 24 at which the ray 20 intersects an object 25, e.g. a primitive, in the scene is identified. This closest intersection will be with the object in the scene closest to the sampling position.

A secondary ray in the form of shadow ray 26 may be cast from the closest intersection point 24 to a light source 27. Depending upon the material of the surface of the object 25, another secondary ray in the form of reflected ray 28 may be traced from the intersection point 24. If the object is, at least to some degree, transparent, then a refracted secondary ray may be considered.

Such casting of secondary rays may be used where it is desired to add shadows and reflections into the image. A secondary ray may be cast in the direction of each light source (and, depending upon whether or not the light source is a point source, more than one secondary ray may be cast back to a point on the light source).

In the example shown in FIG. 2, only a single bounce of the primary ray 20 is considered, before tracing the reflected ray back to the light source. However, a higher number of bounces may be considered if desired.

The output data for the sampling position 22 i.e. a colour value (e.g. RGB value) thereof, is then determined taking into account the interactions of the primary, and any secondary, ray(s) cast, with objects in the scene. The same process is conducted in respect of each sampling position to be considered in the image plane (frame) 23.

In order to facilitate such ray tracing processing, in the present embodiments acceleration data structures indicative of the geometry (e.g. objects) in scenes to be rendered are used when determining the intersection data for the ray(s) associated with a sampling position in the image plane to identify a subset of the geometry which a ray may intersect.

The ray tracing acceleration data structure represents and indicates the distribution of geometry (e.g. objects) in the scene being rendered, and in particular the geometry that falls within respective (sub-)volumes in the overall volume of the scene (that is being considered). In the present embodiments, ray tracing acceleration data structures in the form of Bounding Volume Hierarchy (BVH) trees are used (although other forms of acceleration data structure could also or instead be used, if desired).

Figure 3:
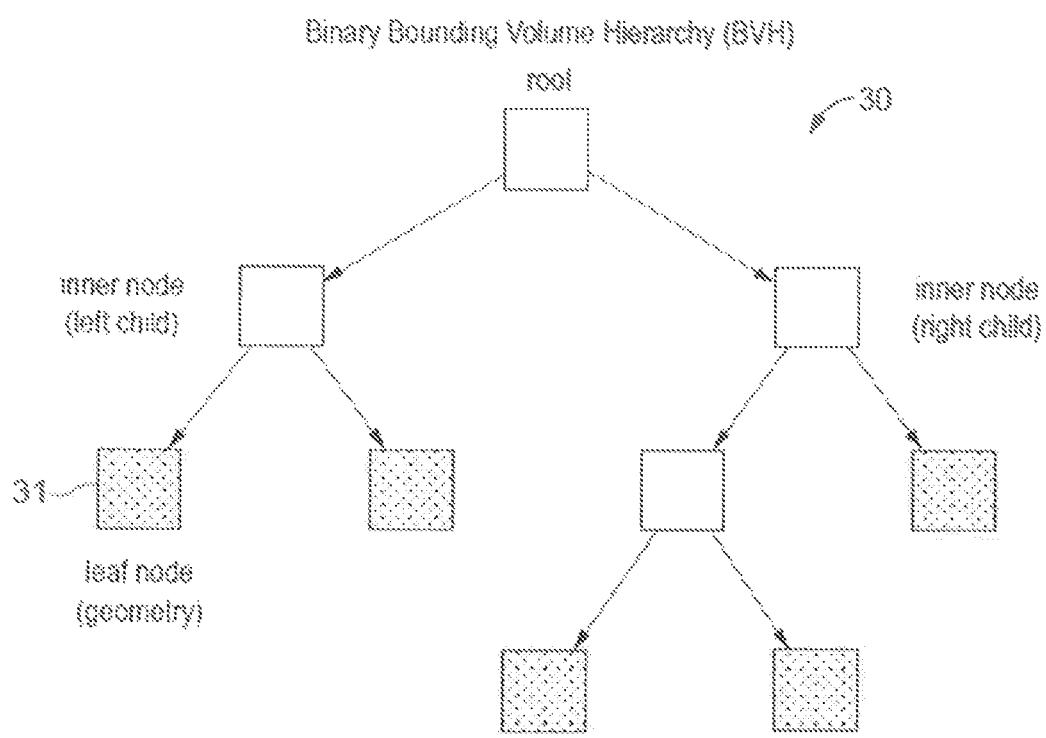
FIG. 3 shows an exemplary ray tracing acceleration data structure.

FIG. 3 shows an exemplary binary BVH tree 30, constructed by enclosing the complete scene in an axis-aligned bounding volume (AABV), e.g. a cube, and then recursively subdividing the bounding volume into successive pairs of two sub-AABVs according to any suitable and desired, and, e.g. various, subdivision schemes (e.g. same number of objects per child, based on traversal cost, etc.), until a desired smallest subdivision (volume) is reached.

Thus, each node in the BVH tree 30 will have a respective volume of the scene being rendered associated with it, with the end, leaf nodes 31 each representing a particular, smallest subdivided volume of the scene, and any parent node representing, and being associated with, the volume of its child nodes. Each leaf node will also correspondingly be associated with the geometry defined for the scene that falls, at least in part, within the volume that the leaf node corresponds to (e.g. whose centroid falls within the volume in question). The BVH tree acceleration data structure also stores (either for the nodes themselves or otherwise, e.g. as sideband information), appropriate information to allow the tree to be traversed volume-by-volume on the basis of the origin and direction of a ray so as to be able to identify a leaf node representing a volume that the ray passes through.

This then allows and facilitates testing a ray against the hierarchy of bounding volumes in the BVH tree until a leaf node is found. It is then only necessary to test the geometry associated with the particular leaf node for intersection with the ray.

Figure 4:
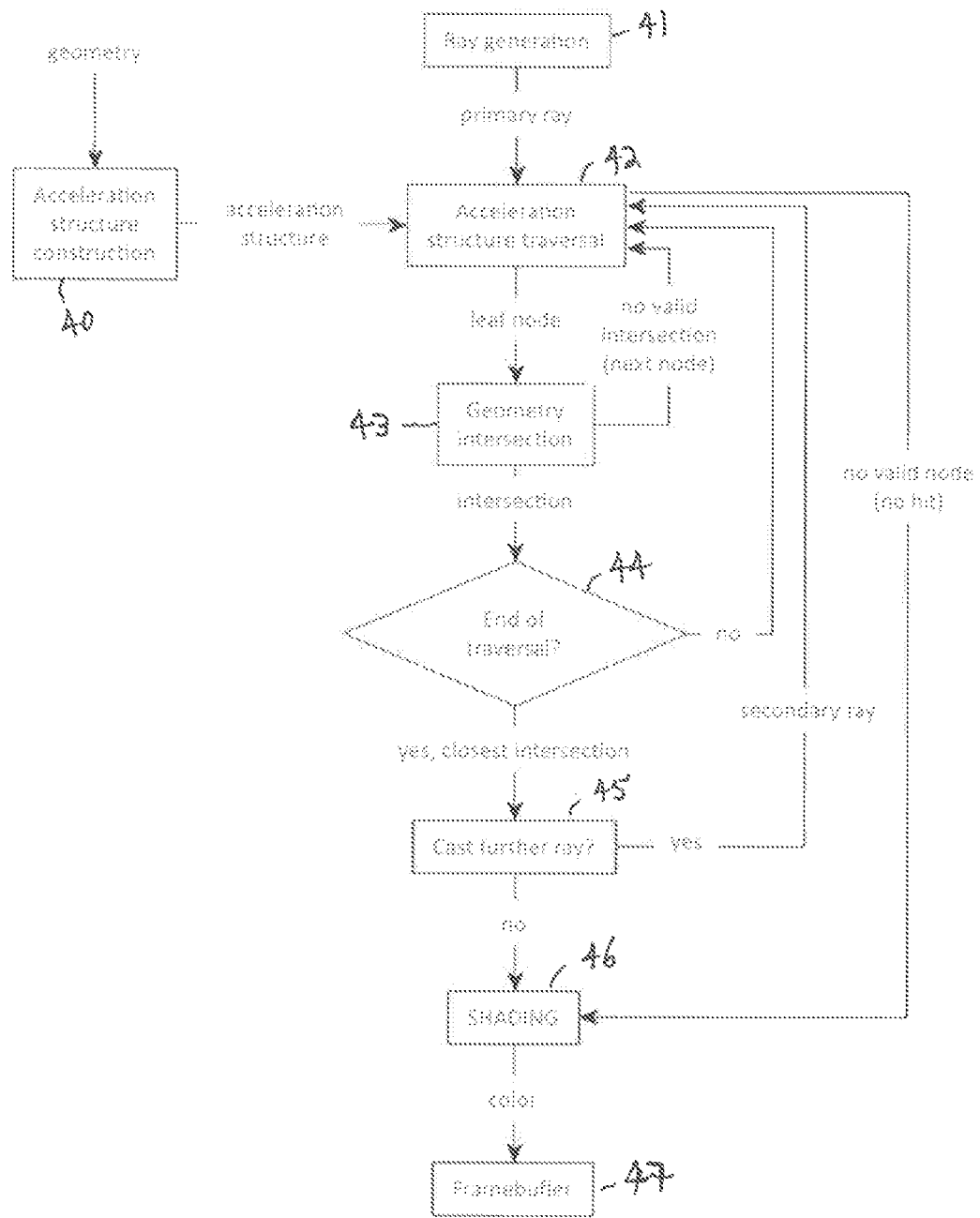
FIG. 4 is a flow chart illustrating an embodiment of a full ray tracing process.

FIG. 4 is a flow chart showing the ray tracing process in embodiments of the technology described herein, and that will be performed on and by the graphics processor 2.

First, the geometry of the scene is analysed and used to obtain an acceleration data structure (step 40), for example in the form of a BVH tree structure, as discussed above. This can be done in any suitable and desired manner, for example by means of an initial processing pass on the graphics processor 2.

A primary ray is then generated, passing from a camera through a particular sampling position in an image plane (frame) (step 41). The acceleration data structure is then traversed for the primary ray (step 42), and the leaf node corresponding to a volume that the ray passes through which contains geometry which the ray potentially intersects is identified. It is then determined whether the ray intersects any of the geometry, e.g. primitives, (if any) in that leaf node (step 43).

If no (valid) geometry which the ray intersects can be identified in the node, the process returns to step 42, and the traversal is continued to identify another leaf node volume that the ray passes through which may contain geometry with which the ray intersects. A test for intersection then performed (step 43), and so on.

In the case that the ray is found to intersect some geometry in a leaf node at step 43, then that intersection result is recorded, and it is then determined whether the traversal of the acceleration of data structure for the ray has been completed (step 44). If the traversal has not yet been completed, then the process returns to step 42, and the traversal is continued.

This is repeated for each leaf node that the ray (potentially) intersects, until the traversal has been completed for the ray.

At this point, the closest intersected geometry defined for the scene that has been found is determined, and then for that closest intersection, it is then determined whether to cast any further (secondary) rays for the primary ray (and thus sampling position) in question (step 45). This may be based, e.g., and in an embodiment, on the nature of the geometry (e.g. its surface properties) that the ray has been found to intersect, and the complexity of the ray tracing process being used. Thus, as shown in FIG. 4, one or more secondary rays may be generated emanating from the intersection point (e.g. a shadow ray(s), a refraction ray(s) and/or a reflection ray(s), etc.). Steps 42, 43, 44 and 45 are then performed in relation to each secondary ray.

Once there are no further rays to be cast, a shaded colour for the sampling position that the ray(s) correspond to is then determined based on the result(s) of the casting of the primary ray, and any secondary rays considered (step 46), taking into account the properties of the surface of the object at the primary intersection point, any geometry intersected by secondary rays, etc. The shaded colour for the sampling position is then stored in the frame buffer (step 47).

If no (valid) node which may include geometry intersected by a given ray (whether primary or secondary) can be identified in step 42 (and there are no further rays to be cast for the sampling position), the process moves to step 46, and shading is performed. In this case, the shading is in an embodiment based on some form of "default" shading operation that is to be performed in the case that no intersected geometry is found for a ray. This could comprise, e.g., simply allocating a default colour to the sampling position, and/or having a defined, default geometry to be used in the case where no actual geometry intersection in the scene is found, with the sampling position then being shaded in accordance with that default geometry. Other arrangements would, of course, be possible.

This process is performed for each sampling position to be considered in the image plane (frame).

Figure 5:
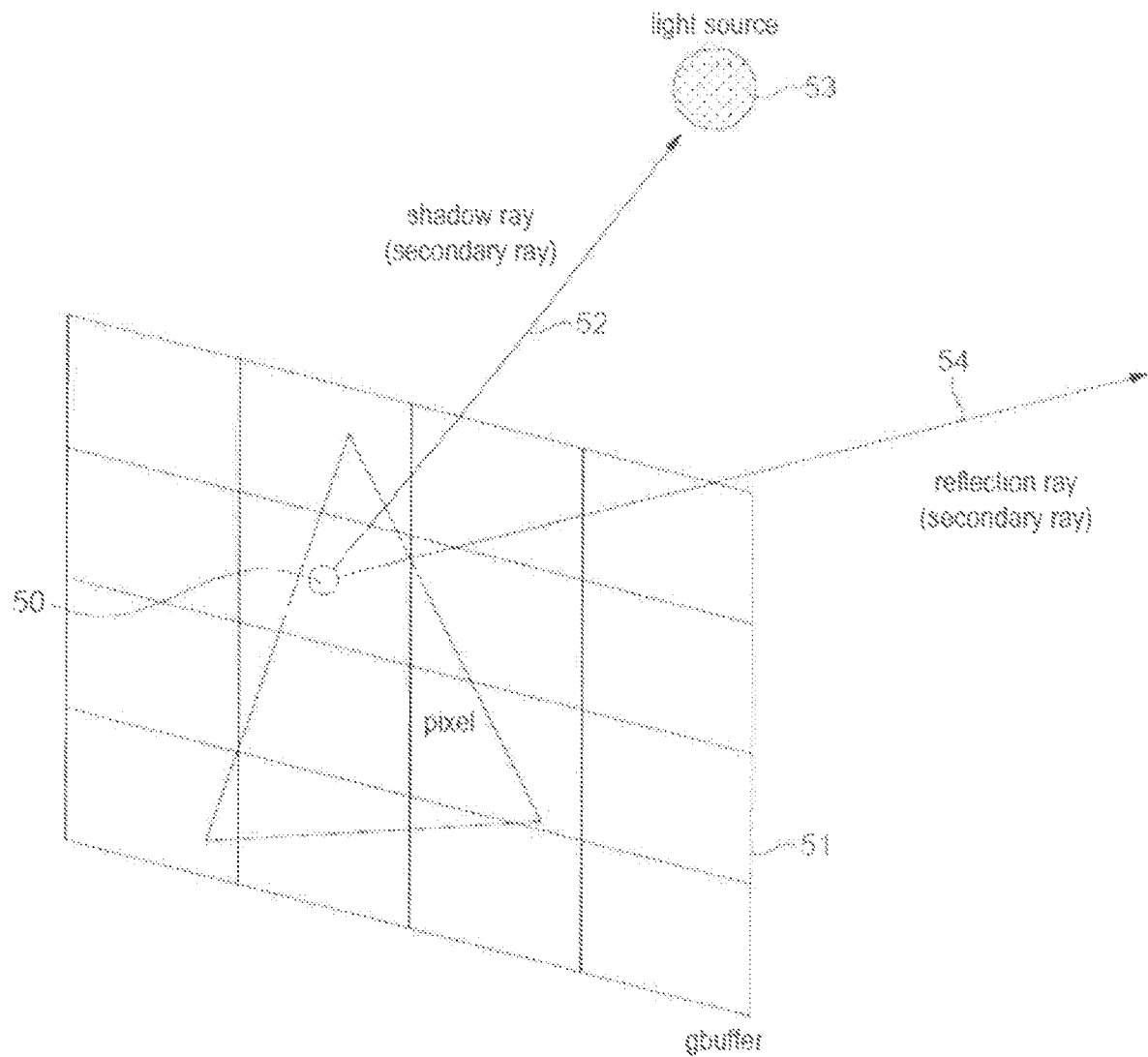
FIG. 5 is a schematic diagram illustrating a "hybrid" ray tracing process.

FIG. 5 shows an alternative ray tracing process which may be used in embodiments of the technology described herein, in which only some of the steps of the full ray tracing process described in relation to FIGS. 3 and 4 are performed. Such an alternative ray tracing process may be referred to as a "hybrid" ray tracing process.

In this process, as shown in FIG. 5, the closest intersection point 50 for each sampling position in the image plane (frame) is instead determined first using a rasterisation process and stored in an intermediate data structure known as a "G-buffer" 51. Thus, the process of generating a primary ray for each sampling position, and identifying the closest intersection point of the primary ray with geometry in the scene, is replaced with an initial rasterisation process to generate the "G-buffer". The G-buffer includes information indicative of the depth, colour, normal and surface properties (the material properties) (and any other appropriate and desired data, e.g. albedo, etc.) for each first (closest) intersection point for each sampling position in the image plane (frame).

Secondary rays, e.g. shadow ray 52 to light source 53, and reflection ray 54, may then be cast starting from the closest intersection point 50, and the shading of the sampling positions determined based on the properties of the geometry first intersected, and the interactions of the secondary rays with geometry in the scene.

Referring to the flowchart of FIG. 4, in such a hybrid process, the initial pass of steps 41, 42 and 43 of the full ray tracing process for a primary ray will be omitted, as there is no need to cast primary rays and determine their closest (first) intersection with geometry in the scene. The closest (first) intersection point data for each sampling position is instead obtained from the G-buffer.

The process may then proceed to the shading stage 45 based on the closest intersection point for each pixel obtained from the G-buffer, or where secondary rays emanating from the closest intersection point are to be considered, these will need to be cast in the manner described by reference to FIG. 4. Thus, steps 42, 43 and 44 will be performed in the same manner as previously described in relation to the full ray tracing process for any secondary rays.

The colour determined for a sampling position will be written to the frame buffer in the same manner as step 46 of FIG. 4, based on the shading colour determined for the sampling position based on the closest intersection point (as obtained from the G-buffer), and, where applicable, the intersections of any secondary rays with objects in the scene, determined using ray tracing.

The present embodiments relate in particular to the operation of a graphics processor when performing ray tracing-based rendering, e.g. as described above with reference to FIGS. 2-4, and in particular to the ray tracing acceleration data structure traversal, geometry intersection, and further processing (steps 42-45 in FIG. 4) performed as part of the ray tracing operation.

Figure 6:
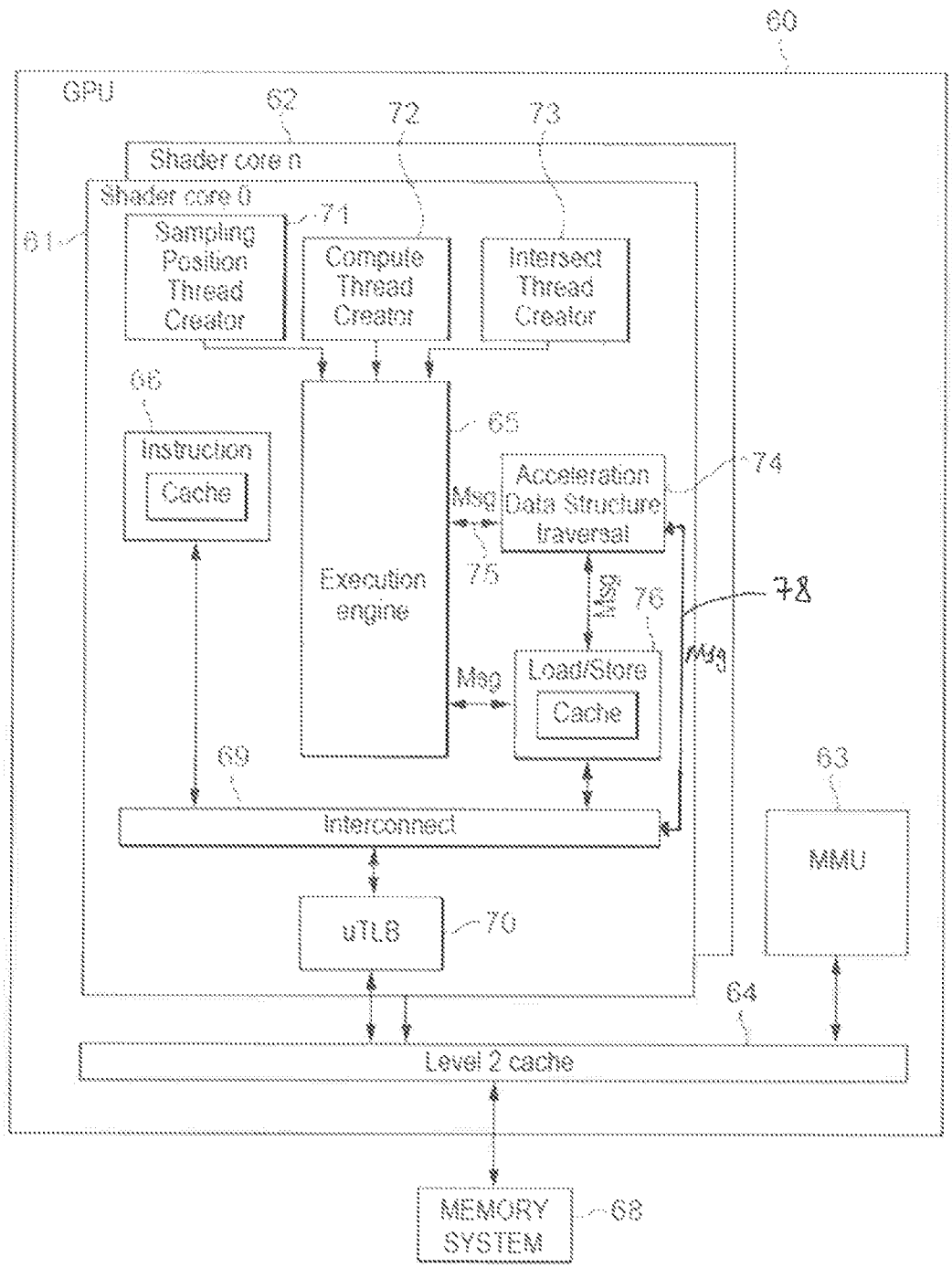
FIG. 6 shows schematically an embodiment of a graphics processor that can be operated in the manner of the technology described herein.

FIG. 6 shows schematically the relevant elements and components of a graphics processor (GPU) 60 of the present embodiments.

As shown in FIG. 6, the GPU 60 includes one or more shader (processing) cores 61, 62 together with a memory management unit (MMU) 63 and a level 2 (L2) cache 64 which is operable to communicate with an off-chip memory system 68 (e.g. via an appropriate interconnect and (dynamic) memory controller (not shown)).

FIG. 6 shows schematically the relevant configuration of one shader core 61, but as will be appreciated by those skilled in the art, any further shader cores of the graphics processor 60 will be configured in a corresponding manner.

(The graphics processor (GPU) shader cores 61, 62 are programmable processing units (circuits) that perform processing operations by running small programs for each "item" in an output to be generated such as a render target, e.g. frame. An "item" in this regard may be, e.g. a vertex, one or more sampling positions, etc. The shader cores will process each "item" by means of one or more execution threads which will execute the instructions of the shader program(s) in question for the "item" in question. Typically, there will be multiple execution threads each executing at the same time (in parallel).)

FIG. 6 shows the main elements of the graphics processor 60 that are relevant to the operation of the present embodiments. As will be appreciated by those skilled in the art there may be other elements of the graphics processor 60 that are not illustrated in FIG. 6. It should also be noted here that FIG. 6 is only schematic, and that, for example, in practice the shown functional units may share significant hardware circuits, even though they are shown schematically as separate units in FIG. 6. It will also be appreciated that each of the elements and units, etc., of the graphics processor as shown in FIG. 6 may, unless otherwise indicated, be implemented as desired and will accordingly comprise, e.g., appropriate circuits (processing logic), etc., for performing the necessary operation and functions.

As shown in FIG. 6, each shader core of the graphics processor 60 includes an appropriate programmable execution unit (execution engine) 65 that is operable to execute graphics shader programs for execution threads to perform graphics processing operations.

The shader core 61 also includes an instruction cache 66 that stores instructions to be executed by the programmable execution unit 65 to perform graphics processing operations. The instructions to be executed will, as shown in FIG. 6, be fetched from the memory system 68 via an interconnect 69 and a micro-TLB (translation lookaside buffer) 70.

The shader core 61 also includes an appropriate load/store unit 76 in communication with the programmable execution unit 65, that is operable, e.g., to load into an appropriate cache, data, etc., to be processed by the programmable execution unit 65, and to write data back to the memory system 68 (for data loads and stores for programs executed in the programmable execution unit). Again, such data will be fetched/stored by the load/store unit 76 via the interconnect 69 and the micro-TLB 70.

The micro-TLB 70 will cache one or more page table entries for virtual-to-physical address translations that have recently been used/required by the shader core 61. (If there is a miss to the micro-TLB 70, then the request is sent to the MMU to search its TLB, and if that misses, perform a walk and return the page table entry.)

In order to perform graphics processing operations, the programmable execution unit 65 will execute graphics shader programs (sequences of instructions) for respective execution threads (e.g. corresponding to respective sampling positions of a frame to be rendered).

Accordingly, as shown in FIG. 6, the shader core 61 further comprises a number of thread creators (generators) operable to generate execution threads for execution by the programmable execution unit 65, including a sampling position thread creator 71 (which will generate execution threads corresponding to sampling positions to be processed), a compute thread creator 72 (which will generate execution threads corresponding to compute items when the graphics processor is performing compute shading operations), and, optionally, an "intersect" thread creator 73 (which is operable to generate execution threads to perform processing operations when the results of ray tracing acceleration data structure traversals are available (this operation will be discussed in more detail below)). (Alternatively, rather than having a separate "intersect" thread creator 73, any additional execution threads for performing ray tracing acceleration data structure traversal processing operations could, for example, be generated by the compute thread creator 72, instead.)

The present embodiments relate in particular to the performing of ray tracing acceleration data structure traversals (i.e. the operation of step 42 of FIG. 4) for rays being processed as part of a ray tracing-based rendering process. In the present embodiments, ray tracing acceleration data structure traversals that are required for rays being processed as part of a ray tracing-based rendering process are performed by the MMU 63.

In order to trigger and control the performance of ray tracing acceleration data structure traversals by the MMU 63, the shader core 61 includes as shown in FIG. 6, a ray tracing acceleration data structure traversal result cache 74, which is in communication with the programmable execution unit 65, and which is operable to trigger 78 the MMU 63 to perform ray tracing acceleration data structure traversals (i.e. the operation of step 42 of FIG. 4) for rays being processed as part of a ray tracing-based rendering process, in response to messages 75 received from the programmable execution unit 65.

In the present embodiments, the ray tracing acceleration data structure traversal result cache 74 is operable to store the results of ray tracing acceleration data structure traversals that have been performed by the MMU 63. The ray tracing acceleration data structure traversal result cache 74 stores information relating to leaf nodes (the final entries in the ray tracing acceleration data structure) that have been determined to be intersected by a ray.

In the present embodiments, the traversal result for a ray that is stored in the ray tracing acceleration data structure traversal result cache 74 comprises a list of primitives and vertices for the intersected leaf (end) node in question, together with an indication of the material type for the primitives of the leaf node (in an embodiment in the form of an index/pointer to a shader program for the material type in question).

As well as storing the leaf node for a ray tracing acceleration data structure traversal, in the present embodiments the ray tracing acceleration data structure traversal result cache 74 also stores corresponding ray tracing acceleration data structure "traversals" (walks), i.e. such that at least all or part of the traversal performed by the MMU 63 can be performed using information stored locally in the acceleration data structure traversal result cache 74 (where it is appropriate to do that). Thus in an embodiment, the acceleration data structure traversal result cache 74 stores as traversal results, both the leaf node end result of a traversal, and the information relating to the traversal itself, in an embodiment starting from the root node for the traversal, down to the leaf node.

The acceleration data structure traversal result cache 74 may store one or more traversal results, as desired, and is in an embodiment operable to replace stored results in accordance with an appropriate cache replacement policy, such as a least recently used cache replacement policy.

The traversal results stored in the ray tracing acceleration data structure traversal result cache 74 are identified (tagged) in the ray tracing acceleration data structure traversal result cache 74 in such a way as to allow it to be determined which ray or rays those results relate to, and so as to allow it to be determined whether those results can be used for another ray (i.e. without the need then to trigger the MMU to perform a ray tracing acceleration data structure traversal). Thus, for example, the traversal results are in an embodiment tagged with appropriate ray parameters such as the starting point and direction so as to allow it to be determined whether the locally stored (cached) traversal results can be reused for a given ray or not.

In operation of the present embodiments, when the execution engine 65 is executing a shader program that requires a ray tracing acceleration data structure traversal for a ray being processed as part of a ray tracing-based rendering process, it will send a message 75 to the acceleration data structure traversal result cache 74 to determine whether the result of the required traversal is already stored in the acceleration data structure traversal result cache 74.

If the traversal result is already stored in the result cache 74, then the result (the leaf node) can simply be (and is) returned from cache 74 to the execution engine 65, without sending any request to the MMU.

On the other hand, when the ray tracing acceleration data structure traversal result cache 74 does not already store the result of the required traversal, an appropriate message 78 is sent to the MMU 63 (via the interconnect 69, etc.) to trigger the MMU 63 to perform the required ray traversal, and to then return the result of the traversal to the ray tracing acceleration data structure traversal result cache 74. Then, once the traversal result has been returned by the MMU 63, that result can be returned by the ray tracing acceleration data structure traversal result cache 74 to the execution engine 65, as appropriate.

This operation will be discussed in more detail below.

Figure 7:
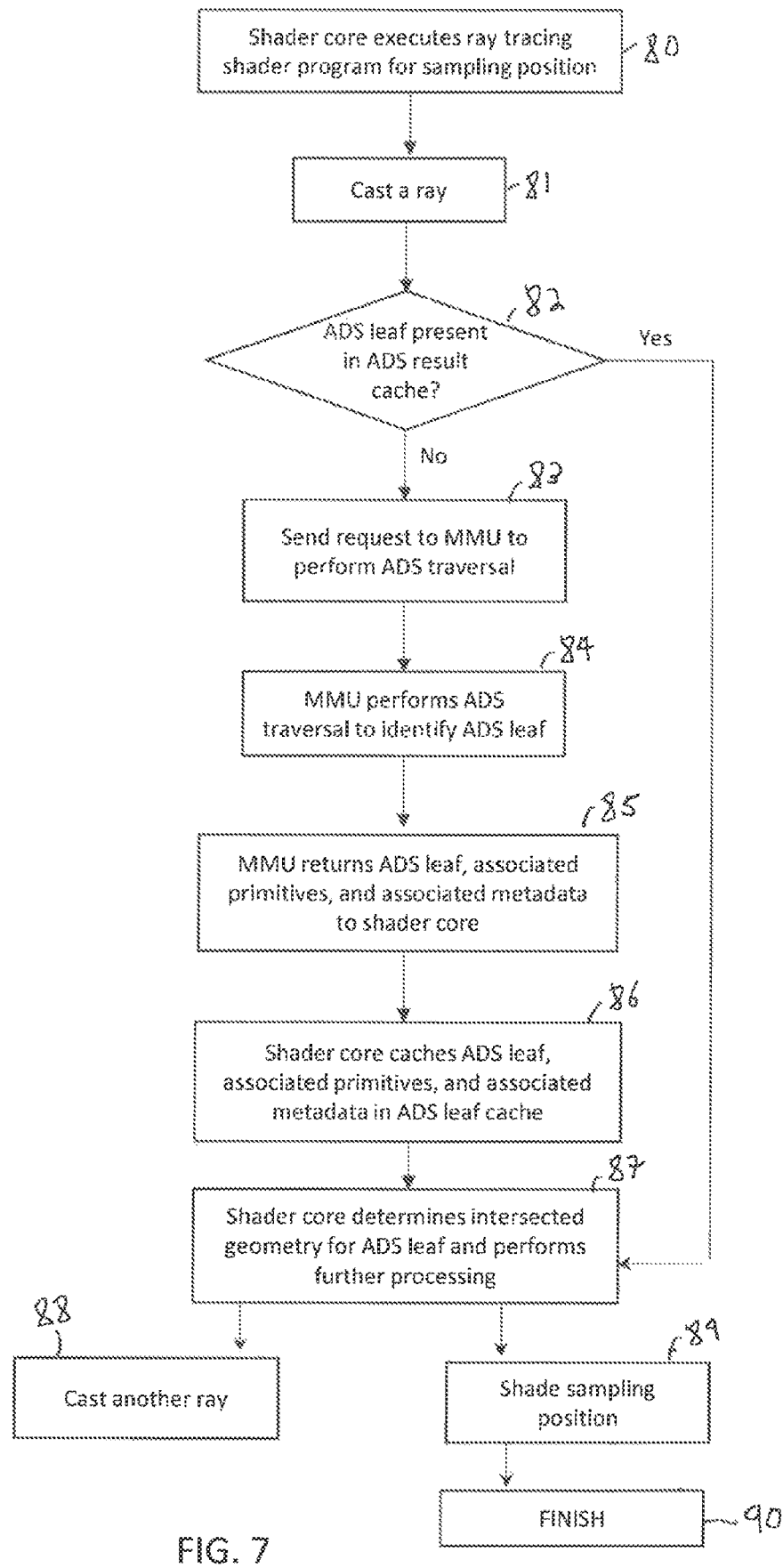
FIG. 7 is a flowchart showing the operation of the graphics processor in FIG. 6 in an embodiment of the technology described herein.

FIG. 7 is a flowchart showing the operation of a shader core 61 of the graphics processor 60 when performing a ray tracing-based rendering process to render a view of the scene in an embodiment of the technology described herein.

FIG. 7 shows the operation in respect of a given sampling position of the frame being rendered. This operation will be repeated for each sampling position of the frame being rendered, and by each respective shader core that is active and being used to render the frame.

As discussed above, in the present embodiments, sampling positions are rendered by generating respective execution threads for the sampling positions and then executing appropriate shader programs for those threads. Thus, the process will start with the sampling position thread creator 71 (or the compute thread creator) generating an appropriate execution thread corresponding to the sampling position that is being rendered. The execution thread will then execute an initial ray tracing shader program to perform the ray tracing-based rendering process for the sampling position (step 80).

In the present embodiments, the initial ray tracing shader program that is executed for a sampling position will, inter alia, include one or more "ray traversal" instructions that when executed trigger the programmable execution unit 65 to send a message 75 to the ray tracing acceleration data structure traversal result cache 74 to determine whether the required traversal result is already stored in the result cache 74.

Thus, as shown in FIG. 7, when, during execution of the initial ray tracing shader program for a sampling position, the programmable execution unit 65 encounters and executes such a "ray traversal" instruction (step 81), the programmable execution unit 65 then sends a message 75 to the ray tracing acceleration data structure traversal result cache 74 to determine whether the required traversal result is already stored in the result cache 74.

The message 75 that is sent from the programmable execution unit 65 to the ray tracing acceleration data structure traversal result cache 74 indicates the ray tracing acceleration data structure that is to be traversed; the origin (originating position (x, y coordinates)) for the ray for which the traversal of the ray tracing acceleration data structure is to be determined; a direction vector for the ray that is to traverse the ray tracing acceleration data structure; and the (minimum and/or maximum) distance the ray is to traverse into the scene.

As shown in FIG. 7, in response to the message from the programmable execution unit 65, it is first determined whether the traversal result (the acceleration data structure leaf node in the present embodiments) is already present in the ray tracing acceleration data structure traversal result cache 74 (step 82).

In the case where the ray tracing acceleration data structure traversal result cache 74 stores only leaf nodes of previous traversals, then this step could comprise, where it is possible to do that, determining whether a leaf node stored in the ray tracing acceleration data structure traversal result cache 74 would be intersected by the new ray and, if so, it then accordingly be determined that that leaf node can be reused for the new ray.

Where the ray tracing acceleration data structure traversal result cache 74 stores previous ray tracing acceleration data structure traversals, then it is in an embodiment determined whether any such stored traversal can be used for a new ray. If so, the new ray is in an embodiment then tested against the root node of the stored traversal, and the stored traversal followed until either the leaf node (which will also be cached in the local storage) is reached, or, on the other hand, there is a divergence during the traversal (i.e. such that the new ray will not follow the locally stored (cached) traversal down to the leaf node), thereby indicating that a new traversal by the MMU for the ray in question needs to be triggered (as the locally cached traversal cannot in fact be reused for the ray).

When the end traversal result (the ADS leaf) is present in the result cache 74, then the result from the result cache 74 is used to perform further processing for the ray in question, including in particular determining whether any geometry in the volume represented by the ADS leaf node in question is actually intersected by the ray, and the appropriate further processing in accordance with that determination (step 87).

On the other hand, in the case where the required traversal result is not already stored in the ray tracing acceleration data structure traversal result cache 74 (there is a "miss" in the result cache, or divergence from any cached "traversal"), the result cache 74 sends a request 78 to the MMU 63 to perform the required ray tracing acceleration data structure traversal for the ray in question (step 83).

The request 78 indicates, as discussed above, the ray tracing acceleration data structure that is to be traversed; the origin (originating position (x, y coordinates)) for the ray for which the traversal of the ray tracing acceleration data structure is to be determined; a direction vector for the ray that is to traverse the ray tracing acceleration data structure; and the (minimum and/or maximum) distance the ray is to traverse into the scene.

The MMU 63 then performs the ray tracing acceleration data structure traversal to identify the final entry (the leaf node) in the acceleration data structure (the smallest volume) that the ray in question intersects (step 84).

The traversal operation performed by the MMU uses the information provided about the ray to traverse the ray tracing acceleration data structure to determine geometry for the scene to be rendered that may be intersected by the ray in question. In the present embodiments, the traversal process operates to traverse the ray tracing acceleration data structure based on the position and direction of the ray, to determine for each volume of the scene that the ray passes through in turn, whether there is any geometry in the volume (indicated by the ray tracing acceleration data structure), until a first (closest) (potential) intersection with geometry defined for the scene is found for the ray.

Other arrangements would, of course, be possible.

The ray tracing acceleration data structure traversal for a ray can comprise traversing a single ray tracing acceleration data structure for the ray, or traversing plural ray tracing acceleration data structures for the ray (e.g. in the case where the overall volume of, and/or geometry for, the scene is represented by plural different ray tracing acceleration data structures, and/or where an initial ray tracing acceleration data structure that indicates further ray tracing acceleration data structures to be traversed is first traversed).

Once the MMU 63 has performed the necessary traversal or traversals for a ray, and determined geometry that is (potentially) intersected by the ray, that information is returned to the shader core 61 (step 85), for the programmable execution unit 65 to perform further processing for the sampling position in question as a result of, and based on, the result of the determined traversal for the ray.

The returned traversal result from the MMU includes, in the case that the ray was found to intersect a volume of the scene that contains geometry defined for the scene as shown in FIG. 7, information relating to the acceleration data structure leaf node in question, including an indication of the primitives associated with that leaf node, and associated metadata for the leaf node, such as an indication of the material/surface type for the primitives associated with the leaf node (e.g. in the form of indexes/pointers to data structure(s) where data relating to the properties of the geometry is stored and/or to shader programs to be executed for the particular material/surface types in question).

As shown in FIG. 7, the result of the traversal returned by the MMU to the shader core 61 is cached in the ray tracing acceleration data structure traversal result cache 74 of the shader core 61 (step 86).

In the case that the MMU finds that the ray does not traverse any volume that contains defined geometry for the scene, then the MMU returns, e.g. an indication of a predefined, "bounding" surface that is to be used for rays that pass through the scene without intersecting any otherwise defined geometry for the scene.

As discussed above, in the present embodiments, the result of the traversal returned by the MMU also includes information relating to the "traversal" itself (as well as the end result (leaf node) identified by the traversal), so that rays can potentially follow that traversal using information stored in the ray tracing acceleration data structure traversal result cache 74 to determine whether it is in fact necessary to trigger the MMU to perform a traversal for a ray.

In the present embodiments, the programmable execution unit 65 executes further "intersect", and, where appropriate, "surface processing", shader program routines that will perform further processing for the sampling position in question based on the result of the ray tracing acceleration data structure traversal for the ray.

In the present embodiments, there are plural different sets of further "surface processing" shader program routines that can be executed, in dependence upon the type of geometry that has been determined by the ray tracing acceleration data structure traversal as (potentially) being intersected by a ray (and in particular in dependence upon the particular surface type (surface property or properties) of the geometry determined by the ray tracing acceleration data structure traversal).

Thus the process operates to select the further "processing" shader program routine to be executed to perform further processing for the sampling position corresponding to a ray in accordance with the type of geometry (and in particular the surface type), that has been determined by the ray tracing acceleration data structure traversal as (potentially) being intersected by the ray.

In order to perform and control this operation, the original execution thread that triggered the ray tracing acceleration data structure is stalled, and then, when the result of the ray tracing acceleration data structure traversal is returned, the stalled thread resumes its execution, e.g. to perform an "intersect" determination, and then to perform the appropriate further "surface processing" shader processing routine based on the intersect determination. This may include the shader core generating (triggering the generation of) further execution threads based on further secondary rays that are to be cast, if necessary, and as appropriate.

To do this, as shown in FIG. 6, the ray tracing acceleration data structure traversal result cache 74 sends a message 75 to the execution engine 65, for the execution engine 65 to resume the execution thread that will execute the appropriate further shader program routine to perform further processing for the sampling position in question, including at least determining whether the ray actually intersects any geometry defined for the scene (step 87).

The message 75 that is sent by the ray tracing acceleration data structure traversal result cache 74 to the execution engine 65 indicates at least the geometry surface type, and the position and direction vectors for the ray. The execution engine 65 then uses that information to select the appropriate further shader program routine to perform further processing for the sampling position in question.

The programmable execution unit 65 then executes the selected further shader program routine for the resumed thread. The execution of the selected further shader program routine will, inter alia, as shown in FIG. 7, use the result of the ray tracing acceleration data structure traversal performed by the MMU and stored in the ray tracing acceleration data structure traversal result cache 74 to determine any geometry that is intersected by the ray in question, and perform further processing for the sampling position in question based on any determined geometry intersection (step 87).

The intersection determination uses the indication of geometry that may be intersected by the ray, together with the relevant ray properties, to test whether any of the geometry is actually intersected by the ray.

As shown in FIG. 7, the further processing for a sampling position that the further shader program routine performs (based on the result of the geometry intersection determination) can include the casting of another ray (a secondary ray) for the sampling position in question (step 88) (in which case the process of using the MMU 63 to perform the ray tracing acceleration data structure traversal for a ray, etc. (steps 81-85) will be repeated for that another (secondary) ray), and, additionally or alternatively, e.g. once all the necessary rays for the sampling position have been cast, shading the sampling position in question (i.e. generating an output colour value for the sampling position in question) (step 89).

Once the final output value for the sampling position in question has been generated, the processing in respect of that sampling position is completed (step 90). A next sampling position may then be processed in a similar manner, and so on, until all the sampling positions for the frame have been appropriately shaded. The frame may then be output, e.g. for display, and the next frame to be rendered processed in a similar manner, and so on.

Figure 8:
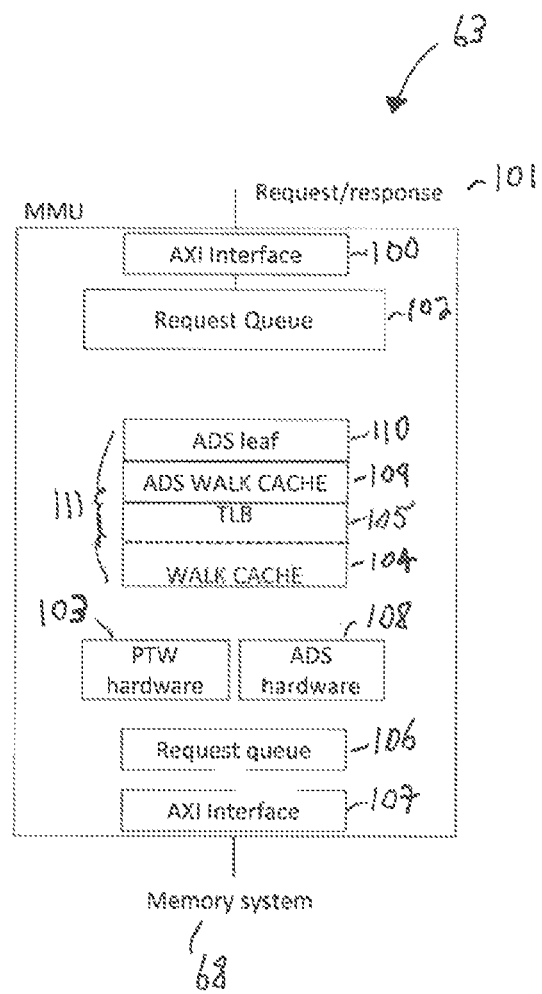
FIG. 8 shows an embodiment of the memory management unit of the graphics processor of FIG. 6.

As discussed above, in the present embodiments, the MMU 63 performs any ray tracing acceleration data structure traversals required when performing rendering using a ray tracing process. FIG. 8 shows the configuration of the MMU in the present embodiments to facilitate this.

It should be noted here that as well as performing any ray tracing acceleration data structure traversals that are required when performing rendering using a ray tracing process, the MMU 63 is also operable to perform "conventional" memory management unit operations, and in particular to determine virtual-to-physical memory address translations for memory accesses.

Thus as shown in FIG. 8, the MMU 63 includes an appropriate interconnect (bus) interface 100 via which it can receive requests 101 both for virtual-to-physical address translations (as in conventional MMU operation) and requests for ray tracing acceleration data structure traversals (as in the embodiments of the technology described herein), from the appropriate functional units of the graphics processor shader core 61, such as the instruction cache 66, load store cache 76 and acceleration data structure traversal result cache 74.

As shown in FIG. 8, the requests will be appropriately queued by the MMU in a request queue 102, with the requests then being processed from that queue, e.g. in turn.

In order to perform (conventional) memory management unit virtual-to-physical address translations, as shown in FIG. 8, the MMU 63 includes an appropriate page table walk circuit (hardware) 103 that is operable to traverse a hierarchy of address translation tables in order to determine the corresponding physical memory address for a virtual memory address. This page table walk circuit 103 is configured to perform a series of one or more table lookups progressing through the hierarchy of addressing tables, based on a received virtual memory address in a translation request, until a physical memory address (or a region of physical memory addresses) is returned by a (final) table lookup in the series of table lookups.

In order to facilitate this operation, the MMU 63 further comprises, as shown in FIG. 8, a (page table) walk cache 104 and a translation lookaside buffer (address translation cache) (TLB) 105. The walk cache 104 is used to cache portions of page table walks that are being performed, such as different level table and block entries for a given translation (different translation levels). The translation lookaside buffer (TLB) 105 caches the final page table entry (the final translation result).

As shown in FIG. 8, the MMU 63 also includes an appropriate request queue 106 and interconnect (bus) interface 107 to the memory system 68 for fetching appropriate page table entries, etc., from the memory system, when performing a page table walk.

In order to facilitate the MMU also performing ray tracing acceleration data structure traversals, as shown in FIG. 8 the MMU 63 correspondingly includes an appropriate acceleration data structure traversal circuit (hardware) 108. This circuit is configured to traverse an acceleration data structure for a ray in a corresponding manner to the way that a page table walk is performed for a virtual-to-physical memory address translation.

Thus the ADS traversal circuit 108 will be operable to traverse a ray tracing acceleration data structure by progressively testing a ray against nodes of the ray tracing acceleration data structure until a final, end node (a leaf node) for the acceleration data structure is reached for the ray, in a corresponding manner to the way that a page table walk is performed. The ADS traversal circuit 108 is thus configured to perform a series of one or more acceleration data structure lookups progressing through the hierarchy of the data structure (progressing down the branches of the acceleration data structure), based on a received ray in a traversal request, until a final node (volume) is returned by a (final) data structure lookup in the series of lookups.

The acceleration data structure traversal circuit 108 may be provided as a separate circuit or circuits to the page table walk circuit 103, but in embodiments, the page table walk circuit 103 and the ADS traversal circuit 108 share processing circuits where appropriate.

Co-locating the acceleration data structure traversal circuits and cache(s) in the MMU in the manner of the present embodiments also facilitates any acceleration data structure traversals that miss in the MMU being processed more efficiently (having a lower latency/higher throughput).

Again, in order to support the ray tracing acceleration data structure traversal, the MMU also comprises an ADS walk cache 109 that is able to, and used to, cache intermediate steps during a ray tracing acceleration data structure traversal, and in particular information regarding the branches of the acceleration data structure that has been followed. This may comprise, for example, pointers to the next level of the data structure and/or the volume that the branch to be followed encompasses. This information may then be used to (try to) speed up future ray tracing acceleration data structure traversals.

The MMU 63 also includes an acceleration data structure traversal result cache 110 that stores the results of ray tracing acceleration data structure traversals, which in the present embodiment comprises the appropriate leaf node information (the final entry in the ray tracing acceleration data structure once the traversal is completed). The traversal result cache 110 thus stores the appropriate leaf node data, in the present embodiments comprising a list of primitives and vertices present in the volume represented by the leaf node, together with metadata indicating the material/surface type for the primitives, in an embodiment in the form of indexes/pointers to the appropriate shader programs for the material/surface types.

Again, when performing a ray tracing acceleration data structure traversal, the MMU 63 can send requests to the memory system 68 for respective ray tracing acceleration data structure traversal data (e.g. corresponding to nodes of the acceleration data structure to be considered), via the request queue 106 and interface 107.

Once the MMU has completed a ray tracing acceleration data structure traversal, then it can return the result of the traversal (as discussed above), via the bus interface 100 (in the same manner as when returning the result of a page table walk).

It would be possible for the respective TLB 105 and page table walk cache 104, and the ADS walk cache 109 and the ADS result cache 110, to be provided as distinctly different (and dedicated) caches of and for the MMU 63, if desired. However, in the present embodiments, a shared (common) cache 111 is used for caching this various information, with capacity in the cache being respectively allocated to the different forms of data that need to be cached, as appropriate.

Figure 9A:
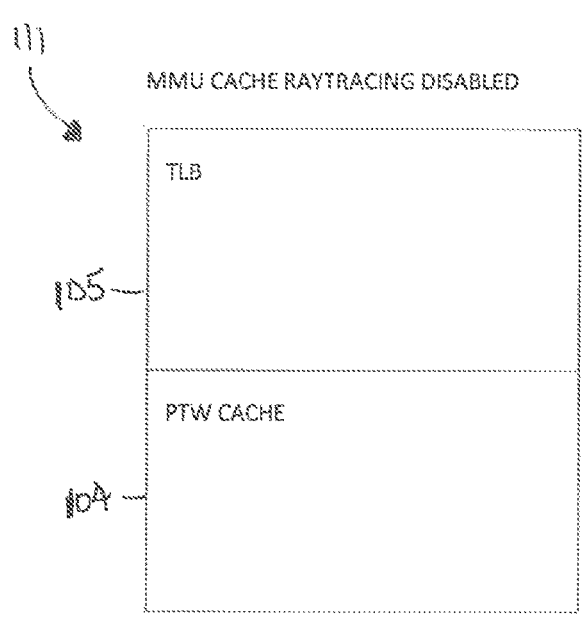
FIGS. 9A and 9B show MMU cache layouts in an embodiment of the technology described herein.
Figure 9B:
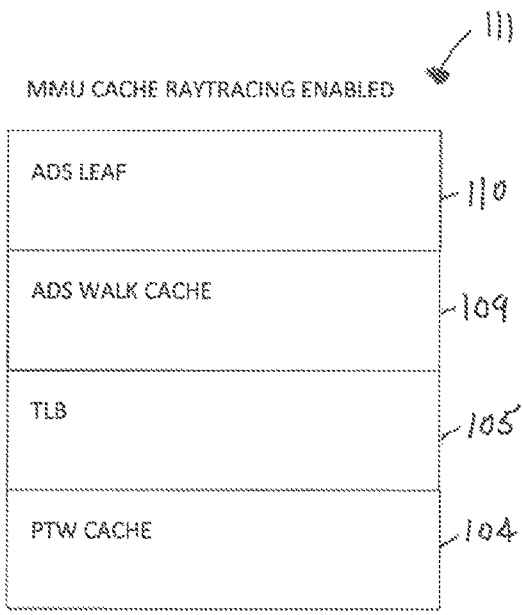

FIGS. 9A and 9B illustrate this. FIG. 9A shows the cache configuration when ray tracing is not being performed (and is not required to be performed) by the MMU 63. In this case, as shown in FIG. 9A, the entire cache 111 is subdivided into the TLB 105 and the page table walk cache 104.

FIG. 9B shows the cache configuration in the case when ray tracing is being performed (is enabled). In this case, the cache 111 is configured so as to provide cache capacity for the ADS walk cache 109 and the ADS result (leaf) cache 110, as well as the TLB 105 and the page table walk cache 104.

By reconfiguring the cache layout in the manner illustrated in FIGS. 9A and 9B, additional cache capacity can be provided for the TLB and page table walk cache when ray tracing is not being performed, thereby increasing TLB capacity and increasing performance (compared to having a smaller TLB).

As will be appreciated from the above, the ray tracing based rendering process of the present embodiments involves, inter alia, the programmable execution unit 65 of the graphics processor 60 executing appropriate shader programs to perform the ray tracing-based rendering. In the present embodiments, these shader programs are generated by a compiler (the shader compiler) 12 for the graphics processor 60, e.g. that is executing on a central processing unit (CPU), such as a host processor, of the graphics processing system (and in an embodiment as part of the driver 11 operation for the graphics processor).

The compiler (driver) will receive the high level ray tracing-based rendering shader program or programs to be executed from the application 13 that requires the ray tracing-based rendering, and then compile that program or programs into appropriate shader programs for execution by the graphics processor, and, as part of this processing, will, as discussed above, include in one or more of the compiled shader programs to be executed by the graphics processor, an appropriate "ray traversal" instruction or instructions to cause the programmable execution unit to send a message to the ray tracing acceleration data structure traversal result cache 74 to (where required) trigger the MMU 63 to perform a ray tracing traversal for a ray. Correspondingly, the compiler will also generate an appropriate set of further "surface processing" shader programs to be executed in response to, and in dependence upon the results of, a ray traversal determined by the MMU.

The compilation process (the compiler) can use any suitable and desired compiler techniques for this.

Figure 10:
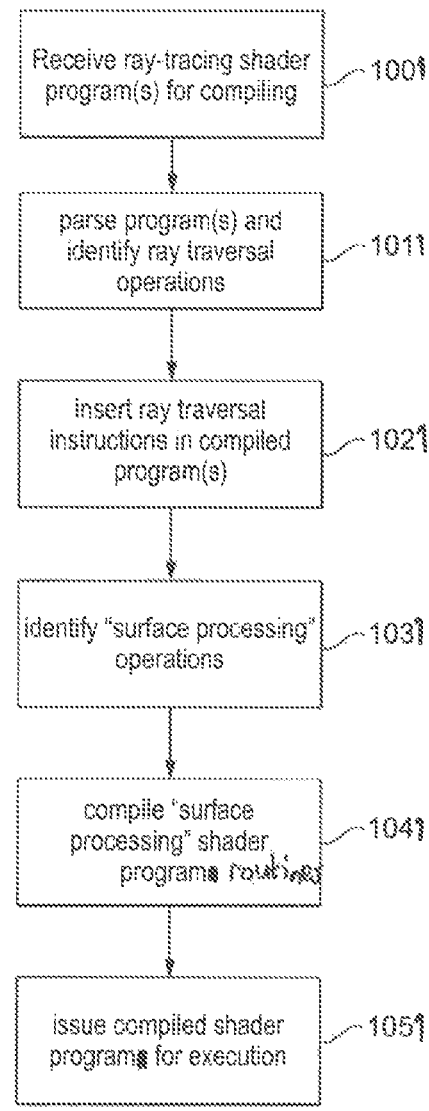
FIG. 10 shows an embodiment of a shader program compilation process.

FIG. 10 shows an embodiment of the compilation process.

As shown in FIG. 10, the compiler for the graphics processor will receive a ray tracing-based rendering program or programs for compiling (step 1001).

The compiler will then analyse the shader program code that is provided, to identify ray traversal operations in that shader program code (step 1011), and to correspondingly insert ray traversal instruction(s) at the appropriate point(s) in the compiled shader program(s) (step 1021).

The compiler will also identify the different "surface processing" operations to be performed in response to the results of ray traversal determinations in the received shader program(s) for compiling (step 1031), and correspondingly compile a set of plural different "surface processing" shader program routines for execution by the graphics processor accordingly (step 1041).

The compiled shader program, including the plurality of different "surface processing" shader program routines, will then be issued to the graphics processor for execution (e.g. stored in appropriate memory of and/or accessible to the graphics processor, so that the graphics processor can fetch the required shader programs for execution as required) (step 1051). (The appropriate "surface processing" shader program routine to be executed can then be selected by including an appropriate case statement in the shader program to select the correct surface processing routine based on the determined material/surface that a ray intersects.)

As will be appreciated by those skilled in the art, a number of variations, modifications, etc., to the above-described embodiments would be possible. For example, the MMU could perform only part of the ray tracing acceleration data structure traversal (and return the result of that partial traversal), with the remainder of the traversal being performed, for example, by the programmable execution unit, or by a ray tracing acceleration data structure traversal circuit associated with the programmable execution unit in the shader core. (In this case the ray tracing acceleration data structure traversal circuit 74 of the graphics processor is in an embodiment a (substantially) fixed-function hardware unit (circuit) that is configured to perform a traversal of a ray tracing acceleration data structure to determine geometry for a scene to be rendered that may be intersected by a ray being used for a ray tracing operation, and is configured to traverse a ray tracing acceleration data structure for a ray in a similar manner to a page table walk in a memory management unit (MMU).)

Similarly, the geometry intersection determination could be performed by an appropriate circuit associated with the programmable execution unit in the shader core, rather than being performed by the programmable execution unit executing a program to do that. Other arrangements and variations would, of course, be possible.

It can be seen from the above that the technology described herein, in its embodiments at least, can provide a more efficient process for performing ray tracing-based rendering. This is achieved, in the embodiments of the technology described herein at least, by using an MMU to perform ray tracing acceleration data structure traversals for rays being processed, but with other processing for the ray tracing-based rendering being performed by executing an appropriate shader program or programs using a programmable execution unit of the graphics processor.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a graphics processing system when rendering a frame that represents a view of a scene comprising one or more objects using a ray tracing process, the graphics processing system comprising: a graphics processor comprising a programmable execution unit; a main memory; and a memory management unit, wherein the graphics processor is able to request data from the main memory via the memory management unit;

the method comprising:
the programmable execution unit of the graphics processor executing a program to render a frame that represents a view of a scene comprising one or more objects using a ray tracing process; and
when the ray tracing process which the programmable execution unit is executing requires the determination of geometry that will be intersected by a ray, performing a traversal of a ray tracing acceleration data structure indicative of the distribution of geometry for the scene being rendered to determine geometry for the scene that may be intersected by the ray, wherein:
the performing a traversal of a ray tracing acceleration data structure indicative of the distribution of geometry for the scene being rendered to determine geometry for the scene that may be intersected by the ray comprises:
the memory management unit (MMU) traversing and using the ray tracing acceleration data structure to identify volumes of the scene that the ray passes through such that at least part of the traversal of the ray tracing acceleration data structure is performed by the memory management unit (MMU).

2. The method of claim 1, wherein the graphics processor comprises a local storage operable to store the results of previous ray tracing acceleration data structure traversals provided by the MMU; and the method comprises:
when the ray tracing process which the programmable execution unit is executing requires the determination of geometry that will be intersected by a ray, first determining whether a result for the required ray tracing acceleration data structure traversal is already stored in the local storage, and when the ray tracing acceleration data structure traversal result is not stored in the local storage, causing the MMU to perform at least part of the required ray tracing acceleration data structure traversal.

3. The method of claim 1, wherein the memory management unit (MMU) is caused to perform at least a part of a traversal of a ray tracing acceleration data structure for a ray by sending a message to trigger that operation to the memory management unit (MMU).

4. The method of claim 1, wherein the MMU performs the entire traversal of the ray tracing acceleration data structure, down to the smallest volume represented by the ray tracing acceleration data structure.

5. The method of claim 1, wherein the MMU returns as the result of a ray tracing acceleration data structure traversal for a ray that it has performed:
in the case where the ray intersects a volume for the scene that contains geometry defined for the scene, an indication of the defined geometry in the volume determined to be intersected by the ray; and
in the case where the ray does not traverse any volume that contains geometry defined for the scene, an indication of that event.

6. The method of claim 5:
further comprising the programmable execution unit:
using the indicated geometry determined by the ray tracing acceleration data structure traversal to determine any geometry that is intersected by the ray; and
performing further processing for a sampling position in the frame that the ray corresponds to in accordance with any geometry for the scene determined to be intersected by the ray.

7. The method of claim 1, wherein the memory management unit includes a circuit or circuits for use when performing a page table walk when translating a virtual memory address to a physical memory address; and the method comprises using at least some of those circuits when performing a ray tracing acceleration data structure traversal.

8. The method of claim 1, wherein the memory management unit comprises a cache for storing the results of previous ray tracing acceleration data structure traversals; and the method comprises:
first determining whether a result for the required ray tracing acceleration data structure traversal is already stored in the cache, and when the ray tracing acceleration data structure traversal result is not stored in the cache, the MMU performing at least part of the required ray tracing acceleration data structure traversal.

9. The method of claim 1, wherein the memory management unit comprises a cache for storing information relating to one or more previous ray tracing acceleration data structure traversals;

and the method comprises:

the MMU using information relating to a previous ray tracing acceleration data structure traversal stored in the cache when performing a ray tracing acceleration data structure traversal.

10. A graphics processor, the graphics processor comprising:

a programmable execution unit, wherein the programmable execution unit is operable to execute programs to perform graphics processing operations; and a memory management unit;

wherein the graphics processor is configured to, when the programmable execution unit of the graphics processor is executing a program to render a frame that represents a view of a scene comprising one or more objects using a ray tracing process and the ray tracing process which the programmable execution unit is executing requires the determination of geometry that will be intersected by a ray:

trigger the performance of a traversal of a ray tracing acceleration data structure indicative of the distribution of geometry for the scene being rendered to determine geometry for the scene that may be intersected by the ray, wherein:

triggering the performance of a traversal of a ray tracing acceleration data structure indicative of the distribution of geometry for the scene being rendered to determine geometry for the scene that may be intersected by the ray comprises: triggering the memory management unit (MMU) to traverse and use the ray tracing acceleration data structure to identify volumes of the scene that the ray passes through such that at least part of the traversal of the ray tracing acceleration data structure is performed by the memory management unit (MMU) of the graphics processor.

11. The graphics processor of claim 10, wherein the graphics processor comprises a local storage operable to store the results of previous ray tracing acceleration data structure traversals provided by the MMU;

and the graphics processor is configured to:

when the ray tracing process which the programmable execution unit is executing requires the determination of geometry that will be intersected by a ray, first determine whether a result for the required ray tracing acceleration data structure traversal is already stored in the local storage, and when the ray tracing acceleration data structure traversal result is not stored in the local storage, cause the MMU to perform at least part of the required ray tracing acceleration data structure traversal.

12. The graphics processor of claim 10, wherein the memory management unit (MMU) is caused to perform at least a part of a traversal of a ray tracing acceleration data structure for a ray by sending a message to trigger that operation to the memory management unit (MMU).

13. The graphics processor of claim 10, wherein the MMU is configured to perform the entire traversal of the ray tracing acceleration data structure, down to the smallest volume represented by the ray tracing acceleration data structure.

14. The graphics processor of claim 10, wherein the MMU is configured to return as the result of a ray tracing acceleration data structure traversal for a ray that it has performed:

in the case where the ray intersects a volume for the scene that contains geometry defined for the scene, an indication of the defined geometry in the volume determined to be intersected by the ray; and in the case where the ray does not traverse any volume that contains geometry defined for the scene, an indication of that event.

15. The graphics processor of claim 14, wherein the programmable execution unit of the graphics processor is configured to:

use the indicated geometry determined by the ray tracing acceleration data structure traversal to determine any geometry that is intersected by the ray; and perform further processing for a sampling position in the frame that the ray corresponds to in accordance with any geometry for the scene determined to be intersected by the ray.

16. The graphics processor of claim 10, wherein the memory management unit includes a circuit or circuits for use when performing a page table walk when translating a virtual memory address to a physical memory address; and is configured to use at least some of those circuits when performing a ray tracing acceleration data structure traversal.

17. The graphics processor of claim 10, wherein the memory management unit comprises a cache for storing the results of previous ray tracing acceleration data structure traversals.

18. The graphics processor of claim 10, wherein the memory management unit comprises a cache for storing information relating to one or more previous ray tracing acceleration data structure traversals.

19. The graphics processor of claim 10, wherein the memory management unit includes a cache that can be used to store both virtual-to-physical memory address translation page table walk data and ray tracing acceleration data structure traversal data.

20. A non-transitory computer readable storage medium storing software code which when executing on one or more processors performs a method of compiling a shader program to be executed by a programmable execution unit of a graphics processor that is operable to execute graphics processing programs to perform graphics processing operations;

the method comprising:

including in a shader program to be executed by a programmable execution unit of a graphics processor when rendering a frame that represents a view of a scene comprising one or more objects using a ray tracing process:

an instruction that when executed will cause the programmable execution unit to trigger a process for the sending of a message to a memory management unit that is operable to perform at least part of a traversal of a ray tracing acceleration data structure indicative of the distribution of geometry for a scene to be rendered to determine geometry for a scene to be rendered that may be intersected by a ray being used for a ray tracing operation, to cause the memory management unit to traverse and use a ray tracing acceleration data structure to identify volumes of a scene that a ray passes through such that the memory management unit performs at least part of a traversal of a ray tracing acceleration data structure for a scene for a ray to determine geometry for the scene that may be intersected by the ray.

\* \* \* \* \*